(12) United States Patent
D'Oria et al.

(10) Patent No.: US 11,341,318 B2
(45) Date of Patent: May 24, 2022

(54) INTERACTIVE TOOL FOR MODIFYING AN AUTOMATICALLY GENERATED ELECTRONIC FORM

(71) Applicant: Kudzu Software, LLC, Roswell, GA (US)

(72) Inventors: Robert Thomas D'Oria, Dexter, MI (US); Eric Eichler, Cumming, GA (US); Ron Douglass, Roswell, GA (US)

(73) Assignee: Kudzu Software LLC, Roswell, GA (US)

( * ) Notice: Subject to any disclaimer, the term of this patent is extended or adjusted under 35 U.S.C. 154(b) by 0 days.

(21) Appl. No.: 16/922,974

(22) Filed: Jul. 7, 2020

(65) Prior Publication Data
US 2022/0012414 A1    Jan. 13, 2022

(51) Int. Cl.
G06F 40/174 (2020.01)
G06F 16/93 (2019.01)
G06F 16/16 (2019.01)

(52) U.S. Cl.
CPC ............ *G06F 40/174* (2020.01); *G06F 16/16* (2019.01); *G06F 16/93* (2019.01)

(58) Field of Classification Search
None
See application file for complete search history.

(56) References Cited

U.S. PATENT DOCUMENTS

| 6,336,124 | B1 | 1/2002 | Alam et al. |
| 6,662,340 | B2 | 12/2003 | Rawat et al. |
| 6,816,630 | B1 | 11/2004 | Werth et al. |
| 6,952,803 | B1 | 10/2005 | Bloomberg et al. |
| 7,215,434 | B1 | 5/2007 | Janse et al. |
| 7,725,834 | B2 | 5/2010 | Bell et al. |
| 8,239,754 | B1 | 8/2012 | Orthlieb |

(Continued)

OTHER PUBLICATIONS

WEMPEN. "Working with Fields and Forms in Word 2016." Word 2016 In Depth. Dec. 22, 2015; retrieved on Aug. 21, 2021 from <https://www.informit.com/articles/article.aspx?p=2455715&seqNum=8>; 8 pages.

(Continued)

*Primary Examiner* — Nathan Hillery
(74) *Attorney, Agent, or Firm* — Norton Rose Fulbright US LLP

(57) ABSTRACT

In some aspects, a method includes receiving data corresponding to a source document. The source document has an input file format. The method includes generating an intermediate file representing an electronic form based on the data. The intermediate file includes metadata indicating one or more elements of the source document, the intermediate file having an intermediate file format. The method includes providing an interactive tool configured to enable display and modification of the electronic form based on user input. The modification includes adding an additional element, deleting at least one of the one or more elements, modifying at least one of the one or more elements, or a combination thereof. The method includes converting the modified intermediate file to an output file having a target output file format. The output file represents the electronic form configured to support user entry of input information. The method includes outputting the output file.

20 Claims, 22 Drawing Sheets

(56) References Cited

U.S. PATENT DOCUMENTS

| | | |
|---|---|---|
| 9,508,043 B1 | 11/2016 | Schlachter et al. |
| 9,928,230 B1 | 3/2018 | Jain et al. |
| 9,934,292 B2 | 4/2018 | Marum et al. |
| 2002/0041386 A1 | 4/2002 | Suzuki et al. |
| 2003/0004971 A1 | 1/2003 | Gong et al. |
| 2004/0093323 A1* | 5/2004 | Bluhm .................... G06F 16/93 |
| 2004/0111675 A1 | 6/2004 | Mori et al. |
| 2004/0153462 A1* | 8/2004 | Bardwell ............ G05B 19/4069 |
| 2004/0205622 A1 | 10/2004 | Jones et al. |
| 2004/0268229 A1* | 12/2004 | Paoli ...................... G06F 40/174 |
| | | 715/200 |
| 2005/0094208 A1 | 5/2005 | Mori |
| 2005/0160359 A1 | 7/2005 | Falk et al. |
| 2005/0210263 A1* | 9/2005 | Levas .................... H04L 9/3271 |
| | | 713/182 |
| 2006/0041484 A1 | 2/2006 | King et al. |
| 2006/0200763 A1 | 9/2006 | Michaelsen et al. |
| 2006/0278724 A1 | 12/2006 | Walker et al. |
| 2007/0106932 A1* | 5/2007 | Coar ....................... G06F 16/93 |
| | | 715/234 |
| 2007/0168382 A1 | 7/2007 | Tillberg et al. |
| 2007/0271085 A1* | 11/2007 | Hamdi ....................... G06F 8/76 |
| | | 703/27 |
| 2007/0277090 A1 | 11/2007 | Raja et al. |
| 2010/0179962 A1 | 7/2010 | Schuster |
| 2010/0211866 A1* | 8/2010 | Nicholas ............... G06F 40/106 |
| | | 715/234 |
| 2010/0251092 A1* | 9/2010 | Sun ....................... G06F 40/174 |
| | | 715/222 |
| 2011/0026828 A1 | 2/2011 | Balasubramanian et al. |
| 2011/0164813 A1 | 7/2011 | Enomoto |
| 2011/0255788 A1 | 10/2011 | Duggan et al. |
| 2012/0137205 A1 | 5/2012 | Pandrangi et al. |
| 2012/0137207 A1 | 5/2012 | Heinz et al. |
| 2013/0061124 A1 | 3/2013 | Patton et al. |
| 2013/0124978 A1* | 5/2013 | Horns .................... G06F 40/169 |
| | | 715/243 |
| 2015/0254227 A1 | 9/2015 | Lin et al. |
| 2015/0278169 A1* | 10/2015 | Vanderport ......... G06F 3/04847 |
| | | 715/208 |
| 2016/0328137 A1* | 11/2016 | Brunswig ............. G06F 3/0482 |
| 2017/0228590 A1 | 8/2017 | Schlachter et al. |
| 2017/0236130 A1* | 8/2017 | Kee .................. G06Q 10/06316 |
| | | 705/7.26 |
| 2017/0359403 A1* | 12/2017 | Brinkman ............. G06F 40/205 |
| 2018/0285332 A1 | 10/2018 | Aghaiipour |
| 2018/0336195 A1* | 11/2018 | Basu ...................... G06F 3/1206 |
| 2019/0147028 A1* | 5/2019 | Hare ..................... G06F 40/174 |
| | | 715/221 |
| 2019/0340240 A1 | 11/2019 | Duta |
| 2019/0370749 A1* | 12/2019 | Milvaney ............. H04L 65/4092 |
| 2020/0004808 A1* | 1/2020 | Yao ...................... G06F 40/106 |
| 2020/0162561 A1* | 5/2020 | Milvaney ............. G06F 40/166 |
| 2020/0380202 A1* | 12/2020 | Cass ....................... G06F 16/22 |
| 2020/0387567 A1* | 12/2020 | Loforte ................. G06F 16/313 |
| 2021/0012102 A1 | 1/2021 | Cristescu et al. |
| 2021/0089619 A1* | 3/2021 | Bhuyan ................. G06F 40/186 |

OTHER PUBLICATIONS

Patent Cooperation Treaty, International Search Report and Written Opinion issued for PCT Application No. PCT/IB2021/055916, dated Sep. 28, 2021, 11 pages.

Patent Cooperation Treaty, International Search Report and Written Opinion issued for PCT Application No. PCT/IB2021/055924, dated Oct. 28, 2021, 8 pages.

"Transform Business Forms to K2 Smartforms"(K2 Webinar Series) Jul. 25, 2019 [online] [retrieved on Aug. 25, 2021]. Retrieved from the Internet <URL:https://www.youtube.com/watch?v=R_adOgXCxFo> entire document, especially 13:00-17:00; 7 pages.

* cited by examiner

300

302 — Producer Information Report
Guaranteed Standard Issue
Graduate Medical Education 306
304

| Residency Program Name | Requested Effective Date (Must be the first of the month) |
| --- | --- |
| Producer Name (Please Print) — 308 | Producer No. | Agency |
| Phone Number | Email Address |

310

Other producer(s) to receive credit for these applications:
Name (Print) _____ Producer No. _____ Percent _____
Name (Print) _____ Producer No. _____ Percent _____
Name (Print) _____ Producer No. _____ Percent _____ — 314

For questions 1-4 please answer Yes or No                                Yes/No
                                                                         — 312
1. Has all licensing been submitted?
If No, please explain:

2. Does the proposed insured read, speak, and understand English?
If No, please explain:

3. To the best of your knowledge, is replacement involved or intended
to be involved with this application 4. Please check which program application is for:
   ☐ In Program    ☐ Graduate Offer I Declare That: #####

316                                         320

_____              _____
Producer Signature                     Date
    318                                    322

Uniform Editor — 400

CURRENT VIEW: 2-Column-Above ▽ Grid ▽ — 402    Save | Close — 404, 406

Form Fields

19232_rev — 410
- ResidencyProgramName
- RequestedEffectiveDate
- ProducerName
- ProducerNo
- Agency
- PhoneNumber
- EmailAddress
- Name
- ProducerNo_2
- Percent
- Name_2
- ProducerNo_3
- Percent_2
- Name_3
- ProducerNo_4
- Percent_3
- 19232_rev

Properties
- Name: TextBox
- Type: String ▽

- TextBox_2
- TextBox_3
- TextBox_4
- InProgram
- GraduateOffer
- ProducerSignature
- Date

---

Producer Information Report
Guaranteed Standard Issue Graduate
Medical Education

| Residency Program Name | Requested Effective Date |
| Producer Name (Please Print) | Producer No. | Agency |
| Phone Number | Email Address |

Other producer(s) to receive credit for these applications:
Name _____ Producer No. _____ Percent ____
Name _____ Producer No. _____ Percent ____

For questions 1-4 please answer Yes or No    Yes/No
1. Has all licensing been submitted?
If No, please explain:
2. Does the proposed insured read, speak, and understand English?
If No, please explain:
3. To the best of your knowledge, is replacement involved or intended to be involved with this application
4. Please check which program application is for:
☐ In Program ☐ Graduate Offer I Declare That: ########

Producer Signature _____ Date — 450

---

Form Element Properties — 408, 412

General — 420
- Data Field: Input field
- Required ☐
- Read Only ☐
- Visible
- Recognition Method: Engine
- Confidence (%): 80

Layout — 422
- Left: 80
- Top: 37
- Width: 30
- Height: 15

Style — 424

Control — 426
- Type: Text Input — 442
- Multi-line ☐
- Allow Rich Text ☐
- is Password ☐
- is Typehead ☐
- Mask
- Text

FIG. 4F

Form Application — 500

☐ Save  ☐ Cancel  ▲ Attach — 502

User ID

Guaranteed Standard Issue Graduate Medical Education — 504

| Residency Program Name — 506 | Requested Effective Date ▲ 508 ☐ — 510 | |
|---|---|---|
| Producer Name (Please Print) | Producer No. | Producer No. |
| Phone Number | Email Address | |

Other producer(s) to receive credit for these applications:
Name _____ Producer No. _____ Percent _____
Name _____ Producer No. _____ Percent _____

For questions 1-4 please answer Yes or No    Yes/No
1. Has all licensing been submitted?
If No, please explain:
2. Does the proposed insured read, speak, and understand English?
If No, please explain:
3. To the best of your knowledge, is replacement involved or intended to be involved with this application
4. Please check which program application is for:
☐ In Program  ☐ Graduate Offer I Declare That: ######   ☐

Producer Signature _____  Date _____

Configure Template — 1004

| Field | Label — 1006 | Control Type — 1008 |
|---|---|---|
| ☐ Title | Title | TextBox ▽ |
| ☐ MyText | My Text | TextBox |
| ☐ MyMultiText | My Multi Text | TextBox |
| ☐ MyRichText | My Rich Text | TextBox |
| ☐ MyChoice | My Choice | TextBox |
| ☐ MyNumber | My Number | TextBox |
| ☐ MyCurrency | My Currency | TextBox |
| ☐ MyDate | My Date | TextBox |
| ☐ MyLookup | My Lookup | TextBox |

Submit   Cancel — 1010

1002

My Forms
Browse

1000

My Forms

New Vines Form
○ Configure
Proposed Data Source(s)
Vines will create the following data structure(s)
[ Form02_structure ▽ ]

Selected Data Source Name
This will become the Title of the data structure
[ Form02_structure ]

Theme
[ Default ▽ ]

Form Views to Create
◉ 1 View    ○ 2 Views    ○ 3 Views

List Item Form         Source View or Vines Template
All                    [ Main ▽ ]

○ Publish
  □ Overwrite existing data structure(s)?
  [ Publish Form ] ← 1208

○ Edit
Full Control over fields, elements (controls), and layout.
[ Open the Form Editor ] ← 1206

[ Cancel ]

INTERACTIVE TOOL FOR MODIFYING AN AUTOMATICALLY GENERATED ELECTRONIC FORM

CROSS-REFERENCE TO RELATED APPLICATION

The present application is related to U.S. patent application Ser. No. 16/922,971 filed on Jul. 7, 2020, entitled "ELECTRONIC FORM GENERATION FROM ELECTRONIC DOCUMENTS," the contents of which are expressly incorporated herein by reference in their entirety.

TECHNICAL FIELD

The present subject matter is directed generally to providing an interactive tool for enabling user modification of an automatically generated electronic form, such as an intelligent web-fillable electronic form.

BACKGROUND

Forms are a common type of paper document. Typically, forms include multiple fields for a person to fill in with various information, such as a name, a date, an answer to a question, a description, or other information. If an enterprise wishes to have employees fill out a paper form, a copy of the form must be made for and provided to each employee, which can take significant amounts of time and resources, such as printer ink, paper, and the like. Additionally, if the form requests entry of sensitive information, the completed paper forms must be stored or destroyed (after obtaining the information contained therein) in a secure manner.

As data processing and electronic documents have evolved, many enterprises have transitioned from using paper forms to using electronic forms, also known as "smart forms." An electronic form or smart form refers to an electronic document that supports features such as electronic completion, dynamic sections, database calls, and electronic submission, among other features. For example, a user may enter information electronically into an electronic form using a computer, and by submitting the electronic form, the user may cause the entries in the electronic form to be provided to a database, server, or other network location for storage and/or additional processing.

If an enterprise wishes to convert a legacy electronic form or a static electronic document to a web-fillable electronic form, an employee of the enterprise or a third party must generate a new electronic form, such as by using an electronic document creation application. Although the legacy electronic form or static electronic may be editable, any edits made to the source document must still be manually entered into the new electronic form. As such, creating and editing new electronic forms from legacy electronic forms or static electronic documents may be time consuming and pose additional costs to the enterprise. These costs may seem particularly burdensome when paper forms already exist, which may cause some enterprises to resist transitioning paper forms to electronic forms.

SUMMARY

The present disclosure provides systems, methods, and computer-readable media for automatically generating a digital document that supports electronic completion (e.g., web-fillable completion), such as an electronic form, and enabling modification of the electronic form by a user. For example, the systems and methods described herein may provide an interactive tool that is configured to display and modify an automatically generated electronic form based on user input. The electronic form may be automatically generated based on a source document (e.g., a legacy electronic form or a static electronic document). In some implementations, the source document may be a portable document format (pdf) file generated by scanning a print document, such as a paper form, or a document generated using a basic word processing or document creation application. The systems and methods described herein may automatically generate an intermediate file that represents an electronic form based on the source document. The intermediate file has an intermediate file format. For example, the intermediate file format may be a "universal" proprietary file format that enables display and editing of the electronic form without restricting the electronic form to a particular file format.

After generating the intermediate file, the systems and methods described herein may provide the interactive tool that is configured to display and modify the electronic form represented by the intermediate file. For example, the interactive tool may display one or more graphical user interfaces (GUIs) that include a displayable version of the electronic form. The interactive tool may also enable a user to modify the electronic form based on user input, such as by adding one or more elements, deleting one or more elements, or modifying one or more elements. For example, the interactive tool may enable the user to add a new element to the electronic form, delete an element from the electronic form, or modify a selected element of the electronic form, such as by changing a location of the selected element, modifying the text included in the selected element, copy the selected element, modifying dimensions of the selected element, modifying formatting associated with the selected element, modifying a label associated with the selected element, modifying a type associated with the selected element, modifying an interactive aspect of the selected element, or modifying a display property of the selected element, as non-limiting examples. Additionally or alternatively, the interactive tool may enable a user to link a data source to a field within the electronic form for auto-populating the field based on the data source. In this manner, a user is able to view and edit the electronic form represented by the intermediate file without manually creating or designing the electronic form.

After modifying the intermediate file, the systems and methods described herein may convert the modified intermediate file to an output file having a target output file format to generate an output file representing the electronic form. For example, images or text of the electronic form may be formatted in accordance with rules associated with the output file format, metadata in the intermediate file may be modified or formatted in accordance with the rules, the elements of the electronic form may be adjusted or formatted in accordance with the rules, and/or data entry and electronic submission parameters may be set in accordance with the rules, as non-limiting examples. The output file may be output for electronic distribution to one or more users, such as via a network, an intranet, the Internet, etc. Thus, the techniques described herein enable display and editing of an electronic form that is automatically generated from a source document, such as a pdf file of a scanned print document or another format of legacy or static electronic document. The generation of the electronic form is performed automatically by the system, thereby reducing (or eliminating) manual input during the process, and the electronic form is converted to one of multiple output file formats. In some implementations, one or more submission parameters associated with an output file may be set to cause generation of one or more data structures that include input data from the electronic form upon submission of the electronic form, and the one or more data structures may be used to enable additional operations, such as workflow operations, as further described herein.

In one particular aspect, a method for converting legacy electronic forms and static electronic documents to web-fillable electronic forms includes receiving data corresponding to a source document. The source document has an input file format. The method also includes generating an intermediate file representing an electronic form based on the data. The intermediate file includes metadata indicating one or more elements of the source document, the intermediate file having an intermediate file format. The method includes providing an interactive tool configured to enable display and modification of the electronic form based on user input. The modification includes adding an additional element, deleting at least one of the one or more elements, modifying at least one of the one or more elements, or a combination thereof. The method also includes converting the modified intermediate file to an output file having a target output file format. The output file represents the electronic form configured to support user entry of input information. The method further includes outputting the output file.

In another aspect, an apparatus for converting legacy electronic forms and static electronic documents to web-fillable electronic forms may be provided. The apparatus includes a processor and a memory coupled to the processor. The memory stores instructions that are executable by the processor to cause the processor to receive data corresponding to a source document. The source document has an input file format. The instructions are also executable by the processor to cause the processor to generate an intermediate file representing an electronic form based on the data. The intermediate file includes metadata indicating one or more elements of the source document, the intermediate file having an intermediate file format. The instructions are executable by the processor to cause the processor to provide an interactive tool configured to enable display and modification of the electronic form based on user input. The modification includes adding an additional element, deleting at least one of the one or more elements, modifying at least one of the one or more elements, or a combination thereof. The instructions are also executable by the processor to cause the processor to convert the modified intermediate file to an output file having a target output file format. The output file represents the electronic form configured to support user entry of input information. The instructions are further executable by the processor to cause the processor to output the output file.

In yet another aspect, non-transitory computer-readable medium may be provided. The non-transitory computer-readable medium may store instructions that, when executed by a processor, cause processor to perform operations that include receiving data corresponding to a source document. The source document has an input file format. The operations also include generating an intermediate file representing an electronic form based on the data. The intermediate file includes metadata indicating one or more elements of the source document, the intermediate file having an intermediate file format. The operations include providing an interactive tool configured to enable display and modification of the electronic form based on user input. The modification includes adding an additional element, deleting at least one of the one or more elements, modifying at least one of the one or more elements, or a combination thereof. The operations also include converting the modified intermediate file to an output file having a target output file format. The output file represents the electronic form configured to support user entry of input information. The operations further include outputting the output file.

The foregoing broadly outlines the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 3 shows an example of a source document according to some aspects of the present disclosure;

FIGS. 4A-4F show views of an example of a user interface (UI) for supporting display and modification of an electronic form according to some aspects of the present disclosure;

FIGS. 5A-5B show views of an example of a UI of an electronic form application for enabling user filling of an electronic form according to some aspects of the present disclosure;

FIG. 6 shows another example of a source document according to some aspects of the present disclosure;

FIGS. 7A-7B show views of another example of a UI of an electronic form application for enabling user filling of an electronic form according to some aspects of the present disclosure;

FIG. 8 shows another example of a UI of an electronic form application for enabling user filling of an electronic form according to some aspects of the present disclosure;

FIGS. 9 and 10 show examples of UIs displayed by the electronic form application of FIG. 8;

FIG. 12 shows another example of a UI displayed by the electronic form application of FIG. 8;

FIGS. 13A-13B show views of another example of a UI of an electronic form application for enabling user filling of an electronic form according to some aspects of the present disclosure.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
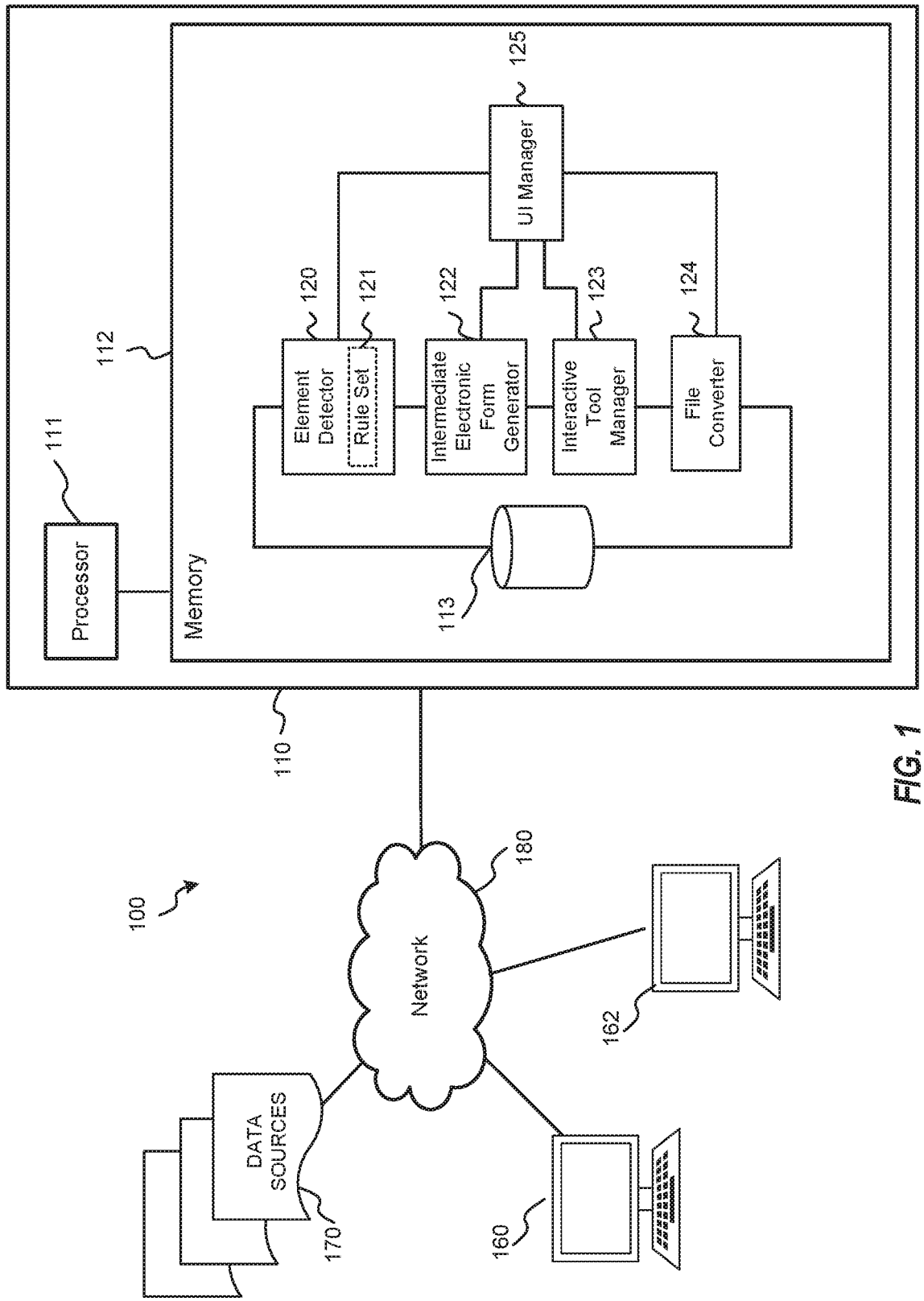
FIG. 1 shows a system configured to for provide an interactive tool for displaying and modifying an automatically generated electronic form according to some aspects of the present disclosure.

FIG. 1 is a block diagram of an exemplary system 100 configured with capabilities and functionality for providing an interactive tool for displaying and modifying an automatically generated electronic form. As shown in FIG. 1, system 100 includes server 110, at least one user terminal 160, at least one output terminal 162, at least one data source 170, and network 180. These components, and their individual components, may cooperatively operate to provide functionality in accordance with the discussion herein. For example, in operation according to one or more implementations, data (e.g., corresponding to source documents) may be obtained from data sources 170 and may be provided as input to server 110. The various components of server 110 may cooperatively operate to perform generation of an electronic form from the data. For example, the various components of server 110 may cooperatively operate to selectively detect one or more elements in the source document based on a predetermined element interpretation rule set. Alternatively, the various components of server 110 may determine one or more elements in the source document based on metadata included in the source document. The various components of server 110 may also generate an intermediate file representing an electronic form based on the source document (e.g., based on the detected elements). The components of server 110 may provide an interactive tool that enables display and modification of the electronic form represented by the intermediate file by a user of server 110 or at least one user terminal 160. The components of server 110 may convert the intermediate file into an output file having a target output file format. The output file may be stored or distributed to one or more other devices, such as at least one output terminal 162, for data entry by one or more recipients. As such, various aspects of the present disclosure provide an interactive tool for displaying and modifying an automatically generated electronic form based on a source document, which may be a legacy electronic form or other type of static electronic document. Although described herein as generating an electronic form, the components of server 110 may be used to generate any type of electronic document that supports electronic completion, such as web-fillable completion, and/or user interaction and electronic submission functionality.

It is noted that the functional blocks, and components thereof, of system 100 of implementations of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

In some aspects, server 110, user terminal 160, output terminal 162, and data sources 170 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between user terminal 160 and server 110 and/or between server 110 and output terminal 162.

User terminal 160 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 160 may be configured to provide a graphical user interface (GUI) via which a user may be provided with information related to data and information received from server 110. For example, user terminal 160 may display one or more GUIs from server 110. The one or more GUIs may facilitate user selection of an input file type, user selection of one or more modifications to the electronic form, user selection of an output file type, or user selection of one or more parameters of a file conversion process, as illustrative, non-limiting examples. The selections or other user actions may be provided to server 110 from user terminal 160 as an input. Additionally or alternatively, the one or more GUIs may enable a user to view a graphical representation of the electronic form during a modification (e.g., editing) process, as a non-limiting example.

Output terminal 162 may be implemented as a mobile device, a smartphone, a tablet computing device, a personal computing device, a laptop computing device, a desktop computing device, a computer system of a vehicle, a PDA, a smart watch, another type of wired and/or wireless computing device, or any part thereof. Output terminal 162 may be configured to receive an output file from server 110 and to provide a GUI via which a user may enter information or otherwise interact with an electronic form represented by the output file. Additionally or alternatively, output terminal 162 may include or correspond to (or be replaced with) a network device, such as another server or a database, that is configured to store output files (e.g., electronic forms) for distribution to other terminal devices, such as via a private network, an intranet, the Internet, network 180, or any other type of network connection. In such implementations, output terminal 162 may additionally be configured to store input data received when users interact with the electronic form.

Data sources 170 may comprise at least one source of textual data, image data, or both, corresponding to one or more source documents. For example, the data source(s) may include a database or other electronic storage of electronic documents, such as legacy electronic forms or other static electronic documents, that have been scanned from physical documents or generated by a word processing or document creation application. In some implementations, data sources 170 may be owned or operated by an individual or an enterprise, and may be integrated within server 110 or accessible to server 110 via network 180, such as a network, WLAN, or an intranet, as non-limiting examples. Additionally or alternatively, data sources 170 may be owned or operated by a third party, and may be accessible via the Internet (or other network 180). For example, data sources 170 may include an online forms data source, a business data source, a legal compliance data source, a streaming data source, a database, a social media feed, a data room, another data source, the like, or a combination thereof. In some implementations, the data from data source 170 may include or correspond to one or more source documents designed to be at least partially completed by a user, such as a form. In some implementations, the data from data source 170 does not include metadata that indicates elements of the source document, such as an electronic document that has been scanned from a physical document or created without such metadata by an application. In some other implementations, the data from data source 170 may include metadata that indicates elements of one or more source documents.

Server 110 may be configured to receive data from data sources 170, to selectively apply customized text processing algorithms, image processing algorithms, rules-based analysis, machine learning algorithms, and/or other processing to automatically generate an electronic form based on a source document, and to provide an interactive tool configured to enable display and modification of the electronic form based on user input. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some implementations, server 110 may be implemented, wholly or in part, on an on-site system, or on a cloud-based system.

As shown in FIG. 1, server 110 includes processor 111, memory 112, database 113, element detector 120, intermediate electronic form generator 122, interactive tool manager 123, file converter 124, and user interface (UI) manager 125. It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 111, cause processor 111 to perform operations in accordance with the present disclosure. In aspects, memory 112 may also be configured to facilitate storage operations. For example, memory 112 may comprise database 113 for storing one or more electronic documents, extracted text data, one or more predetermined element interpretation rule sets, detected element data, one or more intermediate files, an editing application, file type information, one or more conversion algorithms, one or more output files, input (e.g., from user terminal 160), other information, etc., which system 100 may use to provide the features discussed herein. Database 113 may be integrated into memory 112, or may be provided as a separate module. In some aspects, database 113 may be a single database, or may be a distributed database implemented over a plurality of database modules. In some embodiments, database 113 may be provided as a module external to server 110. Additionally, or alternatively, server 110 may include an interface configured to enable communication with data source 170, user terminal 160 (e.g., an electronic device), output terminal 162 (e.g., an electronic device), or a combination thereof.

Element detector 120 may be configured to selectively detect one or more elements from the data corresponding to the source document. The data corresponding to the source document may be image data, such as a portable document format (pdf) file or other file format. The data may be generated by scanning a print document using a scanner, a camera, or another image capturing means, or the document may be electronically created (e.g., such as by a user operating a document creation and/or management application). In some implementations, the data does not include metadata, or any other type of information, indicating elements, or characteristics thereof, of the document, a structure of the document, markers in the document, or the like. In some other implementations, the data does include such metadata.

To illustrate, element detector 120 may be configured to determine whether to perform element detection on the source document (e.g., on the data) based on an input file format of the source document, metadata included in the source document, or a combination thereof. For example, if the input file format is a file type that typically includes detailed information associated with electronic documents, or elements thereof, or if the source document includes metadata that indicates elements, or characteristics thereof, within the source document, element detector 120 may determine not to perform element detection and instead to determine elements within the source document based on the included metadata or other information. Alternatively, if the input file format is a file type that is associated with static electronic documents and the source document does not include metadata, element detector 120 may determine to perform element detection on the source document to detect one or more elements of the source document.

Based on a determination not to perform element detection on the source document, element detector 120 may identify (e.g., determine) one or more elements within the source document based on the metadata (or other information) included in the source document. For example, element detector 120 may parse and convert the metadata into metadata usable by intermediate electronic form generator 122 to generate one or more elements of an electronic form. Using the metadata to identify the elements within the source document may reduce power consumption and processing resource use, as well as increase speed of automatic electronic form generation, as compared to performing element detection on the source document.

Based on a determination to perform element detection on the source document, element detector 120 may detect one or more element of the source document from the data (e.g., the text data, the image data, etc., of the source document). For example, element detector 120 may be configured to apply customized text processing algorithms, image processing algorithms, rules-based analysis, machine learning algorithms, and/or other processing to the source document (e.g., the data) to detect the elements within the source document. The detectable elements may include any type of element or component of a document, such as one or more text blocks, one or more labels, one or more fields (e.g., text input fields), one or more tables, one or more buttons, one or more check boxes, one or more particularly formatted fields (e.g., date fields, time fields, currency fields, signature fields, etc.), other elements, or a combination thereof. For example, a text block near another element may be a label, an empty line or box may be a text input field, a formation of text and lines in rows and columns may be a table, etc.

Element detector 120 may detect the elements in the source document based on a predetermined element interpretation rule set 121. For example, predetermined element interpretation rule set 121 may include rules for interpreting various detected objects, such as text, lines, shapes, etc., as elements based on characteristics such as position, distance relative to other objects, dimensions, object type, color, formatting, other characteristics, or a combination thereof. In some implementations, predetermined element interpretation rule set 121 includes text recognition rules, visual indicator detection rules, element dimension or size rules, label threshold rules, table detection rules, configurable element detection rules, signature detection rules, other rules, or a combination thereof. To illustrate, the text recognition rules may include one or more rules for performing optical character recognition (OCR) on text within the source document to generate text data (e.g., to "extract" the text data), such as character detection rules, space detection rules, word formation rules, lexical rules, sentence detection rules, etc. Alternatively, element detector 120 may perform OCR on the source document prior to performing element detection. As another example, the visual indicator detection rules may include rules for interpreting visual indicators as belonging to a particular element type, such as rules for interpreting a horizontal line with a particular amount of blank space above as an input field, rules for interpreting particular colors as corresponding to particular element types, or rules for interpreting particular shadings or pixel densities as corresponding to particular element types. As another example, the element dimension or size rules may include rules for interpreting shapes having particular dimensions or sizes, such as boxes or rectangles, as particular element types, such as input fields or tables, based on the dimensions or sizes. As another example, the label threshold rules may include rules indicating a threshold distance and/or direction between an indicator of an input field (or another element type) and a text block for use in interpreting the text block as a label of the input field (or other element type). The table detection rules may include rules for interpreting one or more boxes or rectangles or multiple parallel lines or multiple sets of perpendicular lines as a table based on positions relative to other boxes or rectangles or distances between parallel lines or alignment of intersections of perpendicular lines, rules for detecting a pattern of a table, and rules for interpreting a table as a repeating table based on empty entries (e.g., cells) within a table or multiple entries (e.g., rows or columns) that contain matching text. As another example, the configurable element detection rules may include rules for interpreting input fields within a threshold distance, input fields associated with labels indicating a selectable option (e.g., "Mark X or leave blank"), combinations of particular words (e.g., "Yes/No"), or other indicators as configurable elements, such as buttons or checkboxes. As another example, the signature detection rules may include rules for interpreting an input field as a signature field based on a position of the input field, dimensions of the input field, a label of the input field (or lack thereof), or other information. The above-described rules are illustrative and not to be considered limiting. In other implementations, predetermined element interpretation rule set 121 may include other types of rules.

In some implementations, predetermined element interpretation rule set 121 is static. For example, predetermined element interpretation rule set 121 may be preprogrammed at server 110. Alternatively, one or more rules included in predetermined element interpretation rule set 121 may be dynamically selected from a group of stored element interpretation rules. For example, the one or more rules may be selected based on user selected parameters received responsive to display of a GUI. In this manner, predetermined element interpretation rule set 121 may enable server 110 (e.g., element detector 120) to detect elements in a source document that would otherwise require associated metadata or user-input indicating the elements to identify.

Intermediate electronic form generator 122 may be configured to generate an intermediate file representing an electronic form based on the data. For example, the electronic form may be an electronic document that supports enhanced features, such as user completion (e.g., web-fillable completion), linkages to databases or other data sources, electronic submission, or a combination thereof. The electronic form may include the text, graphics, and other elements included in the received source document. However, in the electronic form, one or more elements may be converted into elements capable of user-manipulation or otherwise interactive elements. For example, a blank line for receiving text in the source document may be converted to a text box in the electronic form that is configured to display text based on received user input and to optionally re-size based on the amount of text. As another example, a field that indicated selection between two options (e.g., as signified by "Circle one: yes/no") may be replaced with a checkbox or a button. As yet another example, a field designated for receiving a date may be replaced by a calendar indicator that, when selected by a user, causes a pop-up window that includes a calendar with user-selectable dates.

The intermediate file has an intermediate file format. The intermediate file format may be a "uniform" file format that supports the features of an electronic form without being tied to any specific file format or electronic form application. In some implementations, the intermediate file format is a proprietary file format. The intermediate file format may include sufficient information (e.g., related to the elements of the electronic form) such that the intermediate file may be efficiently converted to one or more of multiple different output file types, as further described herein. Additionally, the electronic form represented by the intermediate file may be viewable and editable by an application, such as a proprietary electronic form manager application.

After generation of the intermediate file, the intermediate file may be provided to interactive tool manager 123. Interactive tool manager 123 may be configured to provide an interactive tool that enables display of a graphical representation of the electronic form represented by the intermediate file and modification of the electronic form based on user input. For example, a user (such as using user terminal 160), may be able to move elements within the electronic form, modify characteristics or properties of elements, add elements, delete elements, or make other edits or modifications to the electronic form. In some implementations, the interactive tool may include one or more graphical user interfaces (GUIs) that include the graphical representation of the electronic form, visual elements representing the elements of the electronic form, one or more menus or lists of options for modifying aspects of the electronic form and/or characteristics of the elements, or a combination thereof. Additionally, the GUIs may be configured to prompt a user for user input, such as via a mouse, a keyboard, a touchpad or touchscreen, an audio command, a gesture, another type of user input, or a combination thereof, to indicate modifications, and the graphical representation of the electronic form may be updated based on the modifications. In some implementations, interactive tool manager 123 may support such functionality in combination with one or more GUIs generated by UI manager 125. In some implementations, the interactive tool may be provided to another device, such as user terminal 160. Additionally or alternatively, the interactive tool may be supported and executed by server 110 (e.g., via interactive tool manager 123).

In some implementations, the modifications supported by the interactive tool may include manipulation of locations of one or more elements within the electronic form represented by the intermediate file, manipulation of text included in the one or more elements, copying of the one or more elements, or a combination thereof, based on user input. For example, the user may select a particular element and drag the particular element, or a copy of the particular element, to a new location within the electronic form. As another example, the user may highlight text within a particular element and may type in new or modified text to replace the highlighted text. In some implementations, the modifications may include modifications of characteristics of a selected element, such as dimensions of the selected element, formatting associated with the selected element, a label associated with the selected element, a type associated with the selected element, one or more interactive aspects associated with the selected element, display properties associated with the selected element, or a combination thereof. For example, the interactive tool may display one or more sets of options, menus, or controls for controlling characteristics of the selected element. Any of the characteristics may be modified, such as by entering a new value, increasing or decreasing a default value using arrow keys, sliders, knobs, etc., selecting one or more buttons or checkboxes, or a combination thereof, as non-limiting examples. As a particular example, a type of an input field may be changed to a date field, as further described with reference to FIGS. 4C-4D. As another particular example, a type of a table may be changed to a repeating table, as further described with reference to FIG. 7B. As another particular example, a type of an input field may be changed to a list field, as further described with reference to FIG. 7A. In some implementations, the modifications may include linking a data source to an input field within the electronic form. For example, the user may link an input field to a file or directory path, a database, or another data source, and, when a final version of the electronic form is accessed for user completion, the input field may be auto-populated with information located at the file or directory path, the database, or the other data source. The above-described modification examples are illustrative, and in other implementations, the modifications may include other types of modifications.

File converter 124 may be configured to receive the modified intermediate file and to convert (e.g., publish) the intermediate file to an output file having a particular output file format. That particular output file format (e.g., a target output file format) may include or correspond to a web-fillable file format. In some implementations, UI manager 125 may be configured to generate a GUI that enables user selection of a target output file format. In some other implementations, the particular output file format may be preset or preprogrammed, or selected based on a user that initiated the electronic form generation process or based on a destination for the output file. The particular output file format may be selected from one or more open source file formats, such as HTML, a proprietary electronic form file format (also referred to herein as "Vines" or "Kudzu Vines"), and/or one or more third-party supported electronic form file formats, such as K2 smart forms or SharePoint, as non-limiting examples. File converter 124 may be configured to convert the intermediate file into the output file using one or more conversion algorithms or rules. For example, file converter 124 may be configured to format text, images, elements, metadata, links to external data, or other information from the intermediate file in accordance with formats, rules, or protocols associated with the output file format.

In some implementations, file converter 124 may be configured to, during the conversion process, set one or more submission parameters of the output file to cause generation of one or more data structures upon submission of the electronic form represented by the output file. For example, the output file may be configured to cause receipt of input information from a user who is filling out the electronic form represented by the output file, and the one or more submission parameters may be set such that submission of the electronic form causes generation of one or more data structures that include the input information. As a particular, non-limiting example, the one or more data structures may include a SharePoint® list that is generated based on the input information. SharePoint is a registered trademark of the Microsoft Corporation. In some implementations, the one or more data structures may enable performance of one or more workflow operations. For example, a user of user terminal 160, output terminal 162, or another network device, may initiate a workflow or other processing operations using the one or more data structures as input. Additionally or alternatively, the one or more data structures may be used as input data to an associated application.

After generating the output file, file converter 124 may be configured to output the output file. For example, the output file may be output for storage, such as at database 113, an external database, data sources 170, or another storage location accessible via network 180. In some implementations, the output file may be made available for downloading to other devices, such as via network 180, the Internet, a private network of an enterprise, etc. Additionally or alternatively, the output file may be distributed to one or more other devices, such as output terminal 162, via network 180 for completion by one or more users. In some implementations, a customer (e.g., a user of user terminal 160) may contract with an operator of server 110 to be provided with access to server 110 to facilitate creation and modification of electronic forms based on the customer's electronic documents (or publicly available electronic documents), such as from data sources 170. In some such implementations, the customer may provide user input, via user terminal 160, to select options of the electronic form generation process at server 110, to edit the electronic form represented by the intermediate file, to select options for the output format, or a combination thereof. In some other implementation, a customer may contract with a third party to generate electronic forms based on electronic documents, such as from data sources 170, for the customer. For example, an employee of the third party may use user terminal 160 to control one or more aspects of the electronic form generation process at server 110 and to view and edit the automatically generated electronic form, and the output file may be provided to output terminal 162, which may be owned or operated by the customer.

UI manager 125 may be configured to generate one or more UIs, such as one or more GUIs, to display information and enable user selection of one or more parameters of the electronic form generation process. For example, UI manager 125 may be coupled to element detector 120, intermediate electronic form generator 122, interactive tool manager 123, and file converter 124 to enable generation of UIs corresponding to the operations performed by each of the components 120-124. As an example, UI manager 125 may be configured to generate a UI configured to enable selection of a target output file format. As another example, UI manager 125 may be configured to generate one or more UIs displayed by the interactive tool to enable display and modification of the electronic form represented by the intermediate file. Additional details regarding the UIs generated by UI manager 125 are further described with reference to FIGS. 4A-4F and 11.

The database 113 may be coupled to element detector 120, intermediate electronic form generator 122, interactive tool manager 123, file converter 124, UI manager 125, or a combination thereof. In some implementations, database 113 is configured to store one or more source documents (e.g., input files), extracted text data, one or more predetermined element interpretation rule sets, detected element data, one or more intermediate files, the interactive tool, file type information, one or more conversion algorithms, one or more output files (e.g., prior to distribution to output terminal 162), input (e.g., from user terminal 160), other information, or a combination thereof.

Figure 2:
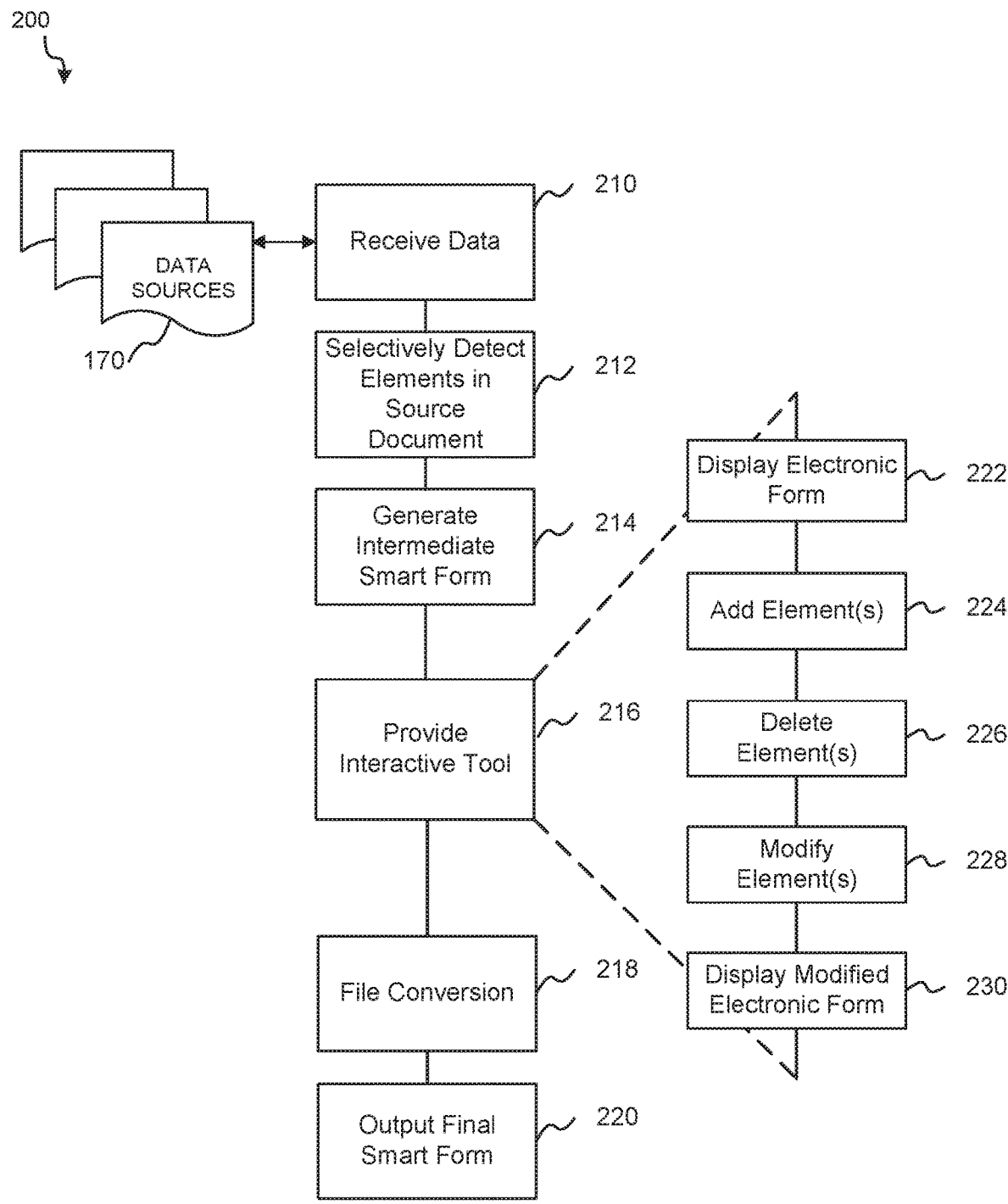
FIG. 2 shows a flow diagram illustrating functionality of the system of FIG. 1 implemented according to some aspects of the present disclosure.

The functionality of server 110 will now be discussed with respect to the block flow diagram illustrated in FIG. 2. FIG. 2 shows a flow diagram illustrating functionality of system 100 for providing an interactive tool for enabling display and modification of an automatically generated electronic form according to some aspects of the present disclosure. Blocks of method 200 illustrated in FIG. 2 may be performed by one or more components of system 100 of FIG. 1. For example, blocks 210 and 212 may be performed by element detector 120, block 214 may be performed by intermediate electronic form generator 122, block 216 and blocks 222-230 may be performed by interactive tool manager 123, and blocks 218 and 220 may be performed by file converter 124. Generation of any UIs performed during the blocks may be performed by UI manager 125. Although blocks 210-230 are described in a particular order, in other implementations, blocks 210-230 may be performed in a different order, one or more of blocks 210-230 may be optional, other operations may be included, or a combination thereof.

At block 210, data is received (e.g., at a receiver). For example, the data may include or correspond to a source document (or multiple source documents) and may be received from data sources 170. As described above, the source document may include a legacy electronic form or other type of static electronic document. The data corresponding to the source document may be image data, such as a portable document file (pdf) file or an image file, or another type of data, such as a word processing document or document associated with a document creation application. The data may be generated by scanning a print document using a scanner, a camera, or another image capturing means, or the source document may be electronically created (e.g., such as by a user operating a document creation and/or management application).

At block 212, detection of elements within the source document is selectively performed. A determination whether to perform the element detection may be based on an input file type associated with the source document, metadata included in the source document, or a combination thereof. For example, if the input file format is a file type that typically includes detailed information associated with electronic documents, or elements thereof, or if the source document includes metadata that indicates elements, or characteristics thereof, within the source document, element detection may not be performed. Alternatively, if the input file format is a file type that is associated with static electronic documents and the source document does not include metadata, element detection on the source document may be performed.

Based on a determination not to perform element detection on the source document, one or more elements within the source document may be identified based on the metadata (or other information) included in the source document. For example, the metadata included in the source document may include positions, dimensions, and formats of input fields, positions, labels, and selectable options associated with checkboxes or buttons, positions, dimensions, numbers of rows, number of columns, and cell formatting associated with tables, links to external resources, other element information, and/or the like. The metadata included in the source document may be parsed and converted into a format that is usable to generate one or more elements of an electronic form (e.g., a web-fillable form). Using the metadata to identify the elements within the source document may reduce power consumption and processing resource use, as well as increase speed of automatic electronic form generation, as compared to performing element detection on the source document.

Alternatively, based on a determination to perform element detection on the source document, one or more elements within the source document are detected. For example, customized text processing algorithms, image processing algorithms, rules-based analysis, machine learning algorithms, and/or other processing may be applied to the source document (e.g., the data) to detect the elements within the source document. Detecting the elements within the source document may include performing optical character recognition (OCR) on the source document, detecting labels within the source document, detecting input fields within the source document, detecting buttons or other user-configurable or other interactive elements within the source document, detecting tables (including repeated tables) within the source document, detecting other types of elements within the source document, or a combination thereof. In some implementations, the one or more elements are detected based on predetermined element interpretation rule set 121.

After the elements in the source document are detected or identified, at block 214, an intermediate electronic form is generated. For example, an intermediate file representing an electronic form may be generated based on the source document (e.g., including the detected or identified elements from the source document). The intermediate file may have an intermediate file type. As described above, the intermediate file type may be a universal file type that supports electronic form functionality, display, and modification, and is able to be efficiently converted to multiple different output file types.

The intermediate file may include metadata associated with each of the elements in the electronic form. The metadata may include position information, dimension information, type information, text data, interactivity information, formatting information, linking information, other information, or a combination thereof, associated with each element in the electronic form. The metadata may formatted in a manner that enables conversion to one or more output file types. In some implementations, the metadata may support additional functionality, such as navigation to different sections or elements of the electronic form, linking the electronic form to different data sources or documents, securing the electronic form, and the like.

At block 216, an interactive tool is provided. The interactive tool may be configured to enable display and modification of the electronic form represented by the intermediate file (e.g., an automatically generated electronic form) based on user input. For example, the interactive tool may display a graphical representation of the electronic form and a user may be able to edit or modify aspects of the electronic form or the elements within the electronic form, such as by using user terminal 160. For example, the user may be able to add additional elements to the electronic form or delete one or more elements from the electronic form. Additionally or alternatively, the user may be able to modify the position of elements within the electronic form. For example, the user may use a user input device to select an element and move the element to a new position within the electronic form. Additionally or alternatively, the user may able to edit parameters associated with the elements within the electronic form. For example, the user may modify text within a text block, label, input field, table, etc., the user may change visual properties associated with the elements (e.g., color, font, size, shading, rotation, alignment, etc.), the user may change a type of an element (e.g., change a check box to a button, a table to a repeating table, etc.), the user may modify properties of the elements (e.g., formatting, dimensions, input type, external links, etc.), or other modifications. The above-described examples are illustrative, in other implementations, the user may perform other types of document modifications. As each modification is performed (e.g., as the corresponding user input is processed), the interactive tool may update the graphical depiction of the electronic form to display the modifications. Additional descriptions of modifications to the electronic form performed by the interactive tool are further described with reference to FIGS. 4A-4F, 5A-5B, 7A-7B, 11, and 13A-13B.

In some implementations, the providing the interactive tool may include performing one or more of the operations described with reference to blocks 222-230. Although blocks 222-230 are described in a particular order, in other implementations, blocks 222-230 may be performed in a different order, one or more of blocks 222-230 may be optional, other operations may be included, or a combination thereof. At block 222, the electronic form may be displayed. For example, the interactive tool may include one or more GUIs that include or display a graphical depiction of the electronic form. The graphical depiction of the electronic form may include text, images, input fields, icons, buttons, check boxes, tables, other visual depictions of elements, or a combination thereof.

At block 224, one or more additional elements may be added. For example, the interactive tool may be configured to display, based on a particular user input (e.g., selection of a new element icon, pressing a particular key or button, or the like), a menu or option list indicating types of elements supported by the electronic form. The user may select a particular element type, and a new element having the selected element type may be created and displayed. Additionally or alternatively, the user may select an element within the electronic form and select a copy option to add a copy of the element to the electronic form. In some implementations, an options list or controls may be displayed prior to creation of the additional element to enable user setting of one or more parameters associated with the additional element. Alternatively, the options list or controls may be displayed subsequent to creation of the additional element, such as due to selection of the additional element.

At block 226, one or more elements within the electronic form may be deleted. For example, the user may select one or more elements of the electronic form by interacting with the interactive tool and select a delete option. Elements may be selected for deletion individually or in groups. In some implementations, elements may be deleted by selecting identifiers of the elements from a list of element identifiers displayed by the interactive tool and selecting the delete option.

At block 228, one or more elements within the electronic form may be modified. For example, a selected element within the electronic form may be moved to a new position using the interactive tool. As another example, a portion or an entirety of a text block or label of the selected element may be replaced using the interactive tool. As another example, one or more parameters of the selected element may be modified by the interactive tool based on user input. The one or more parameters may include dimensions of the selected element, formatting associated with the selected element, a label associated with the selected element, a type associated with the selected element, one or more interactive aspects associated with the selected element, display properties associated with the selected element, other parameters, or a combination thereof. In some implementations, the interactive tool may display a list of options or controls associated with the selected element and that enables configuration of the one or more associated parameters by the user. As another example, a selected element, such as an input field, may be linked to a data source by the interactive tool. Linking a data source to an input field may cause the input field to be auto-populated based on information included in the data source when a final version of the electronic form is accessed for providing input data, as described with reference to FIG. 1. The above-described examples of modifications are illustrative, and in other implementations, modifying the elements within the electronic form may include performing other types of modifications.

At block 230, the modified electronic form is displayed. For example, after any of adding one or more new elements at block 224, deleting one or more elements at block 226, or modifying one or more elements at block 228, the interactive tool may update the graphical depiction of the electronic form to incorporate the changes or modifications to the electronic form. In some implementations, the interactive tool updates the graphical depiction of the electronic form in real-time, or near real-time, to enable the user to visualize the modifications being made to the electronic form.

At block 218, file conversion is performed. To illustrate, the intermediate file may be converted to an output file having an output file format. The output file format may be selected from one or more open source file formats, such as HTML, a proprietary electronic form file format, and/or one or more third-party supported electronic form file formats, such as K2 smart forms or SharePoint, as non-limiting examples. In some implementations, the output file format is user selected. For example, a UI may be displayed that enables a user to select the output file format from one or more supported file formats. Alternatively, the output file format may be preprogrammed or based on other information, such as a user ID of a user controlling the electronic form generation process or a distribution target of the output file, as non-limiting examples. Converting the intermediate file to the output file may include converting or formatting the metadata included in the intermediate file in accordance with one or more rules or protocols associated with the output file format. Additionally or alternatively, converting the intermediate file to the output file may include setting one or more submission parameters, such as a format of submitted data, a location for submitted data, etc., one or more security parameters, such as access credentials required to open or submit the electronic form, an encryption protocol used to encrypt the electronic form (or the submitted data), etc., or a combination thereof. In some implementations, converting the intermediate file to the output file includes setting one or more submission parameters to cause generation of one or more data structures upon submission of the electronic file, the one or more data structures including input information received by the electronic form. As a particular non-limiting example, the output file may be configured to cause generation of a SharePoint list including the input information upon submission of the electronic form represented by the output file.

At block 220, the output file (e.g., representing the final version of the electronic form) is output. For example, the output file may be stored locally (e.g., at server 110, such as at database 113) or at a remote location via network 180. Additionally or alternatively, the output file may be distributed to one or more user devices, such as output terminal 162, or to a network location that enables downloading the output file to the one or more user devices.

As described with reference to FIG. 1, system 100 (e.g., server 110) and its corresponding operations and functions provide the ability to provide an interactive tool that enables display and modification of an automatically generated electronic form. For example, the electronic form may be generated based on a source document (e.g., using element detection or based on metadata or other information included in the source document), and the interactive tool may be configured to display a graphical representation of the electronic form and to receive user input indicating one or more modifications to be made to the electronic form. The interactive tool may also be configured to modify the electronic form based on the user input and update the display of the graphical representation of the electronic form to incorporate the modifications. Accordingly, the techniques of the present disclosure may be implemented to enable display and editing of electronic forms, generated from many different types of source documents and for systems that implement different types of electronic form formats, in less time and with reduced manual input, than other types of electronic form applications.

FIG. 3 depicts an example of a source document 300 according to some aspects of the present disclosure. In some implementations, source document 300 includes a legacy electronic form or another type of static electronic document. For example, source document 300 may be a scanned copy of a physical document or an electronic document generated by a word processing or document creation/management application. In some implementations, source document 300 does not include metadata indicating elements of source document 300. In some other implementations, source document 300 includes at least some metadata indicating elements of source document 300. In the particular illustrative example shown in FIG. 3, source document 300 is a producer information report form.

As shown in FIG. 3, source document 300 may include a header 302, a first input text box 304, a first label 306, a second input text box 308, a second label 310, a first input line 312, a third label 314, a second input line 316, a fourth label 318, a third input line 320, and a fifth label 322. Other elements of source document 300 are not identified for convenience. Header 302 may include or correspond to a title of source document 300, such as "Producer Information Report Guaranteed Standard Issue Graduate Medical Education," as a non-limiting example shown in FIG. 3. First input text box 304 is a box (e.g., a rectangle) designed for a user filling out source document 300 to enter information into. First label 306 includes a text block including information identifying or otherwise associated with first input text box 304. In the particular example of FIG. 3, first label 306 includes the text "Residency Program Name:", indicating that first input text box 304 corresponds to a program name field. Similarly, second input text box 308 is another box designed for the user to enter information into, and second label 310 includes a text block including information identifying or otherwise associated with second input text box 308. In the particular example of FIG. 3, second label 310 includes the text "Phone number", indicating that second input text box 308 corresponds to a phone number field. Input fields in source document 300 may also be indicated by other elements instead of a box, such as a blank line. For example, first input line 312 is a line designed for the user to enter information on, and third label 314 includes a text block including information identifying or otherwise associated with first input line 312. In the particular example of FIG. 3, third label 314 includes the text "Yes/No", indicating that first input line 312 (and additional input lines below first input line 312) correspond to a yes/no field. Similarly, second input line 316 and third input line 320 are lines designed for the user to enter information on, and fourth label 318 and fifth label 322 include text blocks including information identifying or otherwise associated with second input line 316 and third input line 320, respectively. In the particular example of FIG. 3, fourth label 318 includes the text "Producer Signature," indicating that second input line 316 corresponds to a signature field, and fifth label 322 includes the text "Date," indicating that third input line 320 corresponds to a date field.

During an electronic form generation process based on source document 300, one or more of the elements may be detected. For example, first input text box 304 may be detected based on identification of a rectangle with a portion having no text, and first input line 312 may be detected based on identification of a blank line. Alternatively, elements of source document 300 may be identified based on metadata included in source document 300. Other elements may be similarly detected or identified, as further described with reference to FIGS. 1-2.

Because source document 300 is a legacy electronic form (or other type of static electronic document), input information for filling out source document 300 may be entered using a word processing application, or by printing a copy of source document 300 on paper and handwriting the input information. However, once the input information is entered into source document 300, source document 300 (or the printed copy of source document 300) must undergo time consuming and processor intensive text recognition and document detection processes to extract the input information, or the input information must be manually entered into a user terminal. For at least these reasons, the utility of source document 300 may be limited in conventional systems.

FIGS. 4A-4F depict views of an example of a UI (e.g., a GUI) for supporting display and modification of an electronic form according to some aspects of the present disclosure. In some implementations, the views of the UI shown in FIGS. 4A-4F may be generated by UI manager 125 of FIG. 1 and included in or displayed by an interactive tool managed by interactive tool manager 123 of FIG. 1 to enable display and modification of an electronic form based on source document 300 of FIG. 3. For example, the interactive form may be modified based on user input received responsive to UI 400. The electronic form may be represented by an intermediate file, as described with reference to FIGS. 1-2.

Figure 4A:
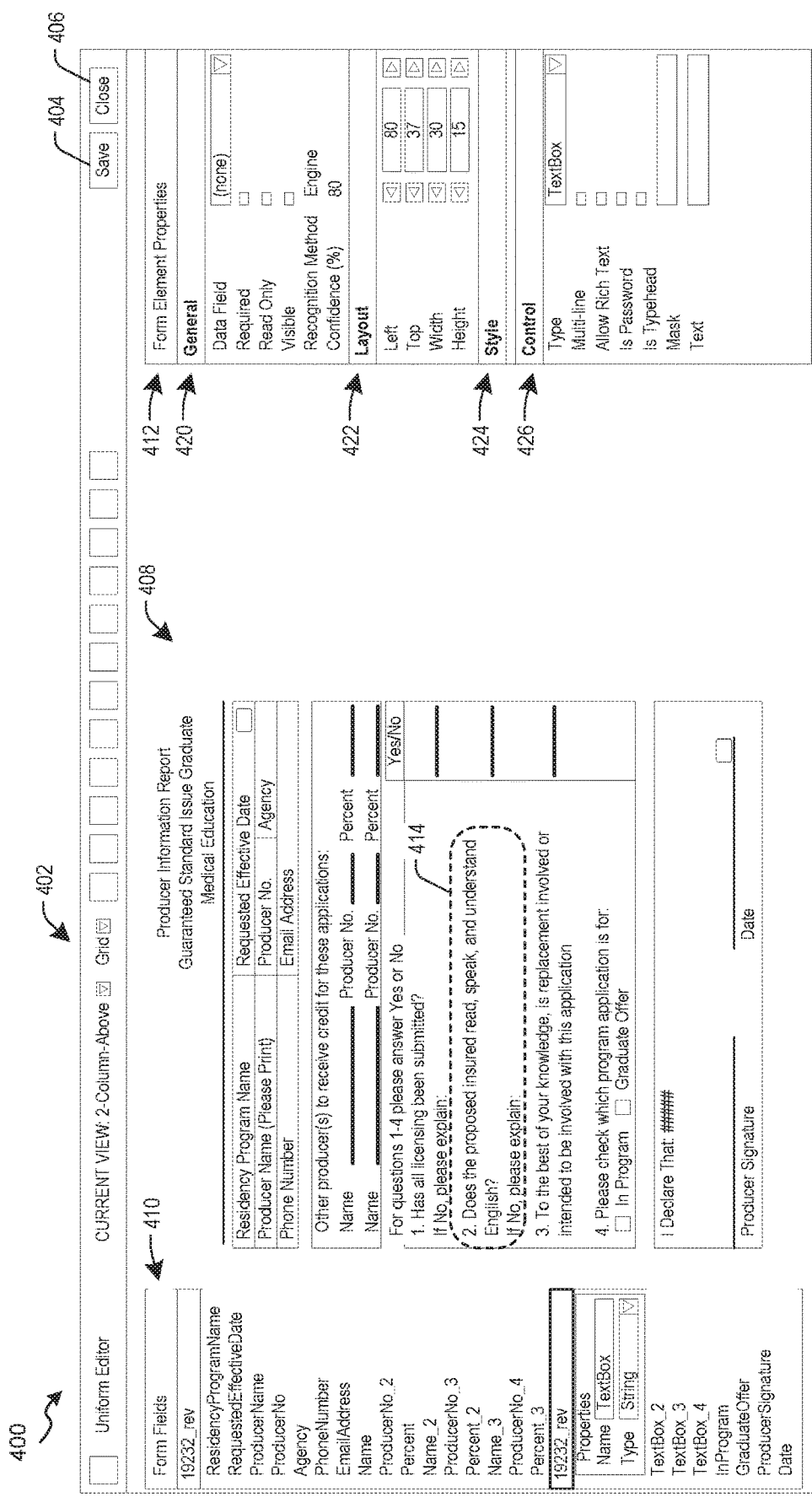

FIG. 4A shows a first view of UI 400 that displays a graphical representation of an electronic form and enables modification of the electronic form, based on user input. UI 400 may include buttons 402-406, a display pane 408, a list of form fields 410, and form element properties 412. The buttons may include buttons that enable control of general settings or operations associated with UI 400. For example, the buttons may include view buttons 402, a save button 404, and a close button 406. View buttons 402 may enable selection of one or more different views for display pane 408, such as a current view, a full-screen view, one or more zoomed views, a split view, a 2-Column-Above view, a grid view, or another type of view. The grid view, when selected, may enable a grid to be displayed (or hidden) on display pane 408. Save button 404 may enable any modifications made to the electronic form to be saved (e.g., to update the intermediate file). Close button 406 may close the interactive tool and return to a window of an electronic form generation procedure, as further described herein.

Display pane 408 may be configured to display at least a portion of the electronic form represented by the intermediate file (e.g., the automatically generated electronic form). The displayed electronic form may include electronic form elements, such as text blocks (e.g., a header ("Producer Information Report Guaranteed Standard Issue Graduate Medical Education"), instructions or questions ("Other producer(s) to receive credit for these applications:", "For questions 1-4 please answer Yes or No", "Has all licensing been submitted?", "I Declare That", etc.), input fields (e.g., program name fields, date fields, producer name fields, producer number fields, phone number fields, e-mail address fields, signature fields, etc.), labels associated with the input fields ("Residency Program Name", "Requested Effective Date", "Producer Name", "Producer No.", "Agency", "Phone Number", "Email Address", "Producer Signature", "Date", etc.), other types of electronic form elements, or a combination thereof, as further described with reference to FIGS. 1-2. In some implementations, UI 400 includes an add option configured to add a field, an element, a control, or a combination thereof, to the electronic form, an edit option configured to edit one or more properties associated with one or more fields, one or more elements, one or more controls, or a combination thereof, included in the electronic form, a delete option configured to delete one or more fields, one or more elements, one or more controls, or a combination thereof, included in the electronic form, or a combination thereof. For example, UI 400 may include one or more buttons (not shown for convenience) that enable adding, editing, or deleting elements of the electronic form. Additionally or alternatively, options to add, edit, or delete elements of the electronic form may be displayed via a list or menu that is displayed in response to a particular user input, such as right clicking within display pane 408 using a mouse. Additionally or alternatively, elements of the electronic form may be modified via operations performed with respect to display pane 408. For example, a position of an element may be changed by selecting the element and moving the element to a new position (e.g., such as via a click and drag operation using a mouse or a touchpad). As another example, text of an element may be changed by selection of a text block and receipt of a user entry indicating new or modified text for the text block. As yet another example, an element may be modified by selecting the element and adjusting one or more properties of form element properties 412.

List of form fields 410 includes a list of identifiers of the various fields included in the electronic form. Selection of one of the field identifiers from list of form fields 410 may cause selection (e.g., highlighting) of the corresponding field in display pane 408. Additionally or alternatively, selection of one of the field identifiers from list of form fields 410 may cause display of parameters or properties associated with the corresponding field, such as a name and a type of the corresponding field, as non-limiting examples. Although the field IDs are illustrated as alphanumeric values, in other implementations, the field IDs may be any alphabetic, numeric, or alphanumeric value that identifies the various fields.

Form element properties 412 may indicate one or more properties or parameters of selected element 414 within display pane 408. In the example of FIG. 4A, selected element 414 is a text block (e.g., "2. Does the proposed insured read, speak, and understand English? If No, please explain:"). Form element properties 412 may include general properties 420, layout properties 422, style properties 424, control properties 426, other properties, or a combination thereof. In some implementations, the properties displayed by form element properties 412 are specific to the element type associated with selected element 414. General properties 420 may include a data formatting property (e.g., a particular type of input field associated with selected element 414, such as a date field, a time field, a currency field, etc., or none), a required property (e.g., whether selected element 414 is required to be completed for submission of the electronic form), a read only property (e.g., whether selected element 414 is read only), a visibility property (e.g., whether selected element 414 is visible in the electronic form), a recognition method property (e.g., how the element was generated, such as by detection or based on metadata), a confidence rating (e.g., a confidence that the element is correct), other general properties, or a combination thereof. Layout properties 422 may include a left position (e.g., an x-coordinate of a left-most pixel of selected element 414), a top position (e.g., a y-coordinate of a top-most pixel of selected element 414), a width of selected element 414, a height of selected element 414, other layout properties, or a combination thereof. Style properties 424 may include a font property (e.g., a font of text associated with selected element 414), a font size property (e.g., a font size of text associated with selected element 414), a weight property (e.g., a weight of text associated with selected element 414), an italic property (e.g., whether text associated with selected element 414 is italicized), an underline property (e.g., whether text associated with selected element 414 is underlined), a strikeout property (e.g., whether text associated with selected element 414 is strike-through), a font color property (e.g., a font color of text associated with selected element 414), a background color property (e.g., a background color of text associated with selected element 414), an alignment property (e.g., an alignment of text associated with selected element 414), other style properties, or a combination thereof. Control properties 426 may include a type property (e.g., whether selected element 414 corresponds to an image, a video, a link, an interactive element, an input field, a text box, or another element type), a multi-line property (e.g., whether the text of the selected element 414 includes multiple lines), an allow rich text property (e.g., whether rich text is allowed in the selected element 414), a password property (e.g., is the selected element 414 a password), a type head property (e.g., is the selected element 414 a type head), a mask property (e.g., a mask to display instead of the selected element 414), a text property (e.g., text to be displayed when the selected element 414 is highlighted in a final version of the electronic form), other control properties, or a combination thereof. Form element properties 412 may be configurable by user input (e.g., text from a user), one or more dropdown menus, one or more checkboxes or buttons, one or more incrementing or decrementing values, one or more arrows or sliders, or a combination thereof, as non-limiting examples. The above-described properties are illustrative, and in other implementations, form element properties 412 may include fewer properties than shown in FIG. 4A, more properties than shown in FIG. 4A, or different properties than shown in FIG. 4A.

Figure 4B:
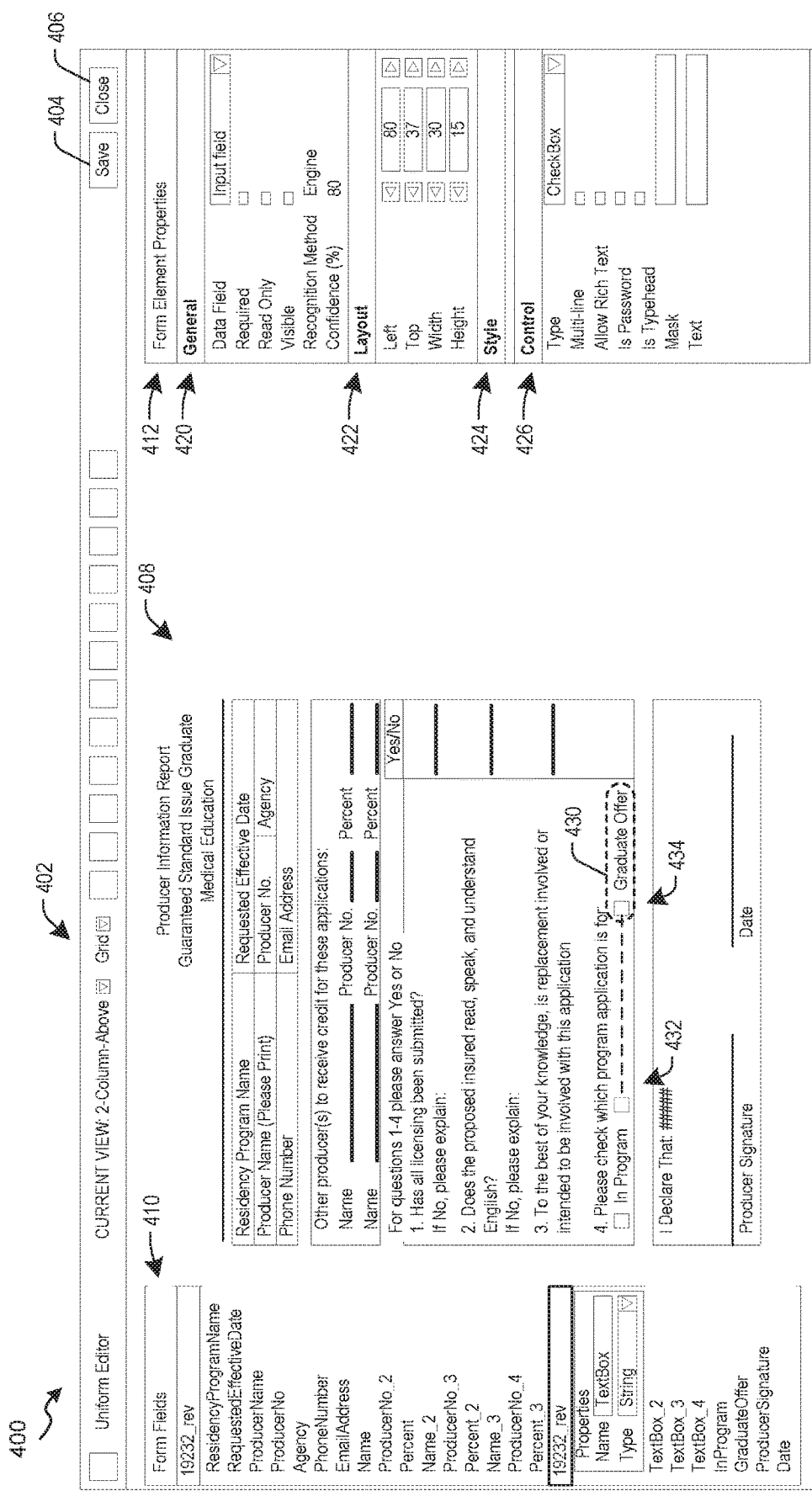

FIGS. 4B-4F show views of UI 400 that show various modifications to the electronic form displayed in UI 400. FIG. 4B shows a second view of UI 400 that shows modification of a location of an element of the electronic form based on a user input. To illustrate, a selected element 430 (e.g., a check box and the associated label, "Graduate Offer") may be modified by changing a location of the selected element 430 from a first location 432 to a second location 434. For example, the user may select the selected element 430, such as by clicking on the selected element 430 within the display pane 408 using a mouse (or other user input device), and the user may change the location of the selected element 430 by dragging the selected element from the first location 432 to the second location 434. Alternatively, the location of the selected element 430 may be modified by changing one or more properties of the layout properties 422. As the location of the selected element is modified, display of the electronic form within the display pane 408 is updated (e.g., by the interactive tool) to display the modified location of the selected element 430.

Figure 4C:
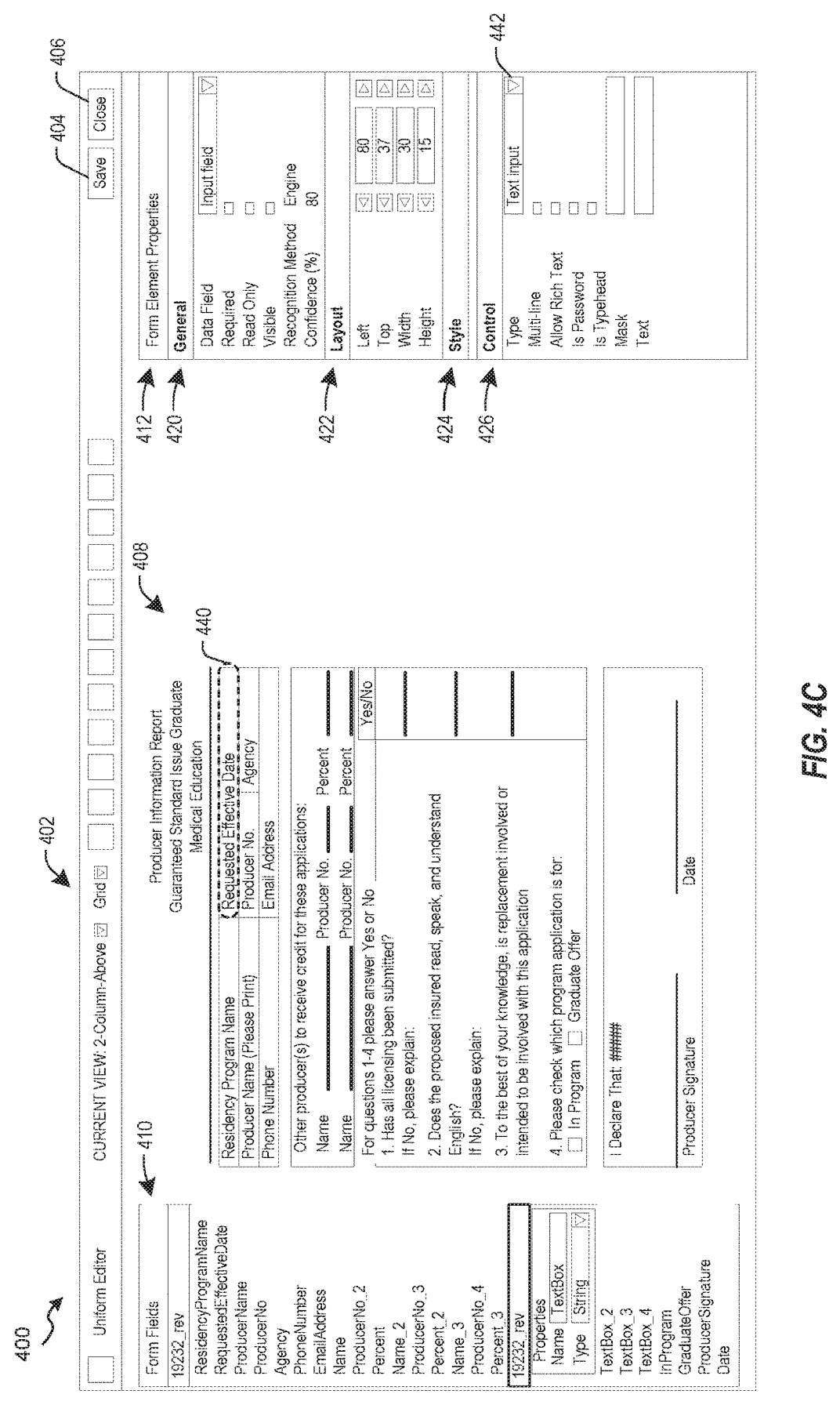
Figure 4D:
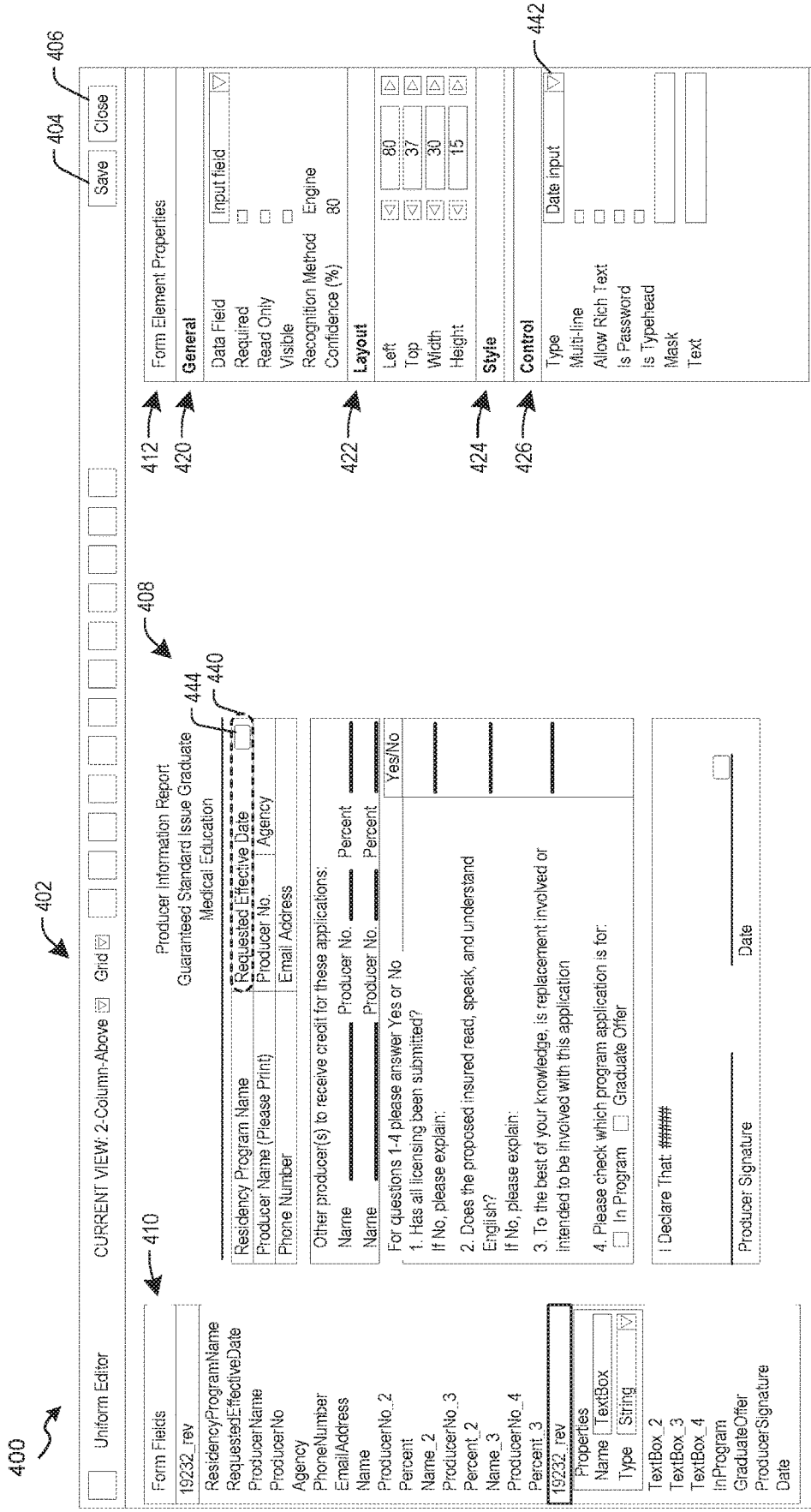

FIGS. 4C and 4D show views of UI 400 that show modification of a type of an input field from an input field to a date field for a selected element within the electronic form displayed in UI 400. FIG. 4C shows a third view of UI 400 that shows selection of an input field. To illustrate, an input field may be selected as selected element 440, such as an input field with an associated label "Requested Effective Date." Upon selection of the selected element 440, form element properties 412 may be updated to show properties of selected element 440. For example, the data field property of general properties 420 may be updated to indicate that selected element 440 is an input field. Additionally, type property 442 of control properties 426 may be updated to indicate that selected element 440 is a text input.

The user may be enabled to modify the type of selected element 440 by changing the type indicated by type property 442. For example, the user may select a dropdown list icon of type property 442, and a list of possible types for selected element 440 may be displayed. The user may change the type by selecting one of the displayed types. For example, the user may select a date field as the type.

FIG. 4D shows a fourth view of UI 400 that shows selected element 440 after the associated type is changed to date field. As seen in FIG. 4D, type property 442 has been updated to indicate that selected element 440 is a date field. In some implementations, modifying the type of an element may modify the visual display of the element or add additional features to the element. For example, based on changing the type of selected element 440 to date field, the interactive tool displays a calendar icon 444 within selected element 440. Calendar icon 444 may be selectable by a user of a final version of the electronic form to display a calendar for selecting a date to input into the date field, as further described herein. In a similar manner, an input field associated with a date at the bottom of the electronic form may also be changed to a date field to enable display of a corresponding calendar icon.

Figure 4F:
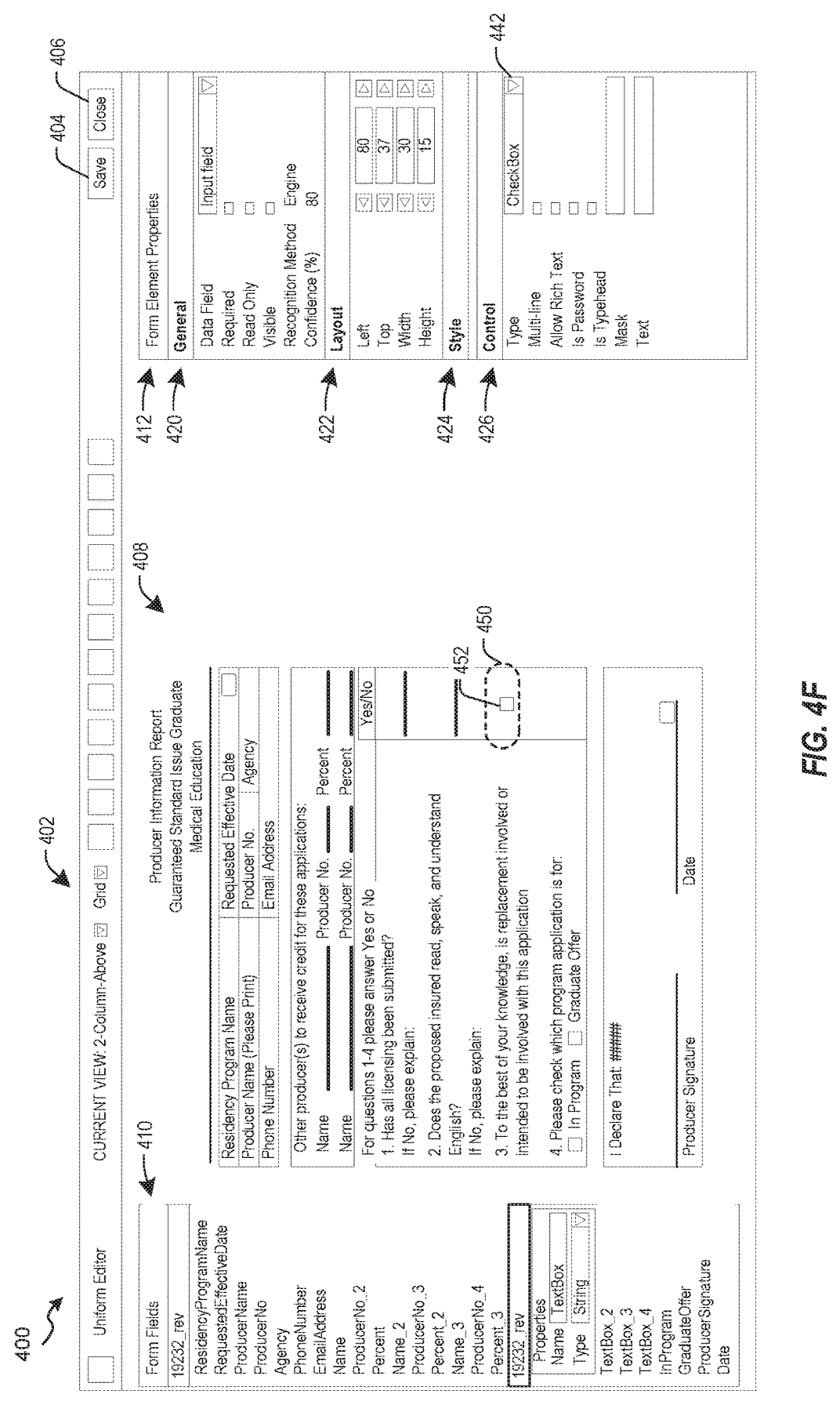

FIGS. 4E and 4F show views of UI 400 that show modification of a type of an input field from an input field to a check box for a selected element within the electronic form displayed in UI 400. FIG. 4E shows a fifth view of UI 400 that shows selection of an input field. To illustrate, an input field may be selected as selected element 450, such as an input field with an associated label "Yes/No." Upon selection of the selected element 450, form element properties 412 may be updated to show properties of selected element 450. For example, the data field property of general properties 420 may be updated to indicate that selected element 450 is an input field. Additionally, type property 442 of control properties 426 may be updated to indicate that selected element 450 is a text input.

The user may be enabled to modify the type of selected element 450 by changing the type indicated by type property 442. For example, the user may select a dropdown list icon of type property 442, and a list of possible types for selected element 450 may be displayed. The user may change the type by selecting one of the displayed types. For example, the user may select a check box as the type.

FIG. 4F shows a sixth view of UI 400 that shows selected element 450 after the associated type is changed to check box. As seen in FIG. 4F, type property 442 has been updated to indicate that selected element 450 is a check box. In some implementations, modifying the type of an element may modify the visual display of the element or add additional features to the element. For example, based on changing the type of selected element 450 to check box, the interactive tool replaces the empty line with a check box 452. Check box 452 may be selectable by a user of a final version of the electronic form to enable selection of a yes option as a response to the third question in the electronic form. Although modifications to types of input fields is described, in other implementations, one or more input fields detected in a source document may be automatically changed to another type, such as a date field or a check box, based on information associated with the input fields. For example, the input field associated with the label "Requested Effective Date" may be changed to a date field based on detection of the keyword "date" within the label associated with the input field.

Figure 5B:
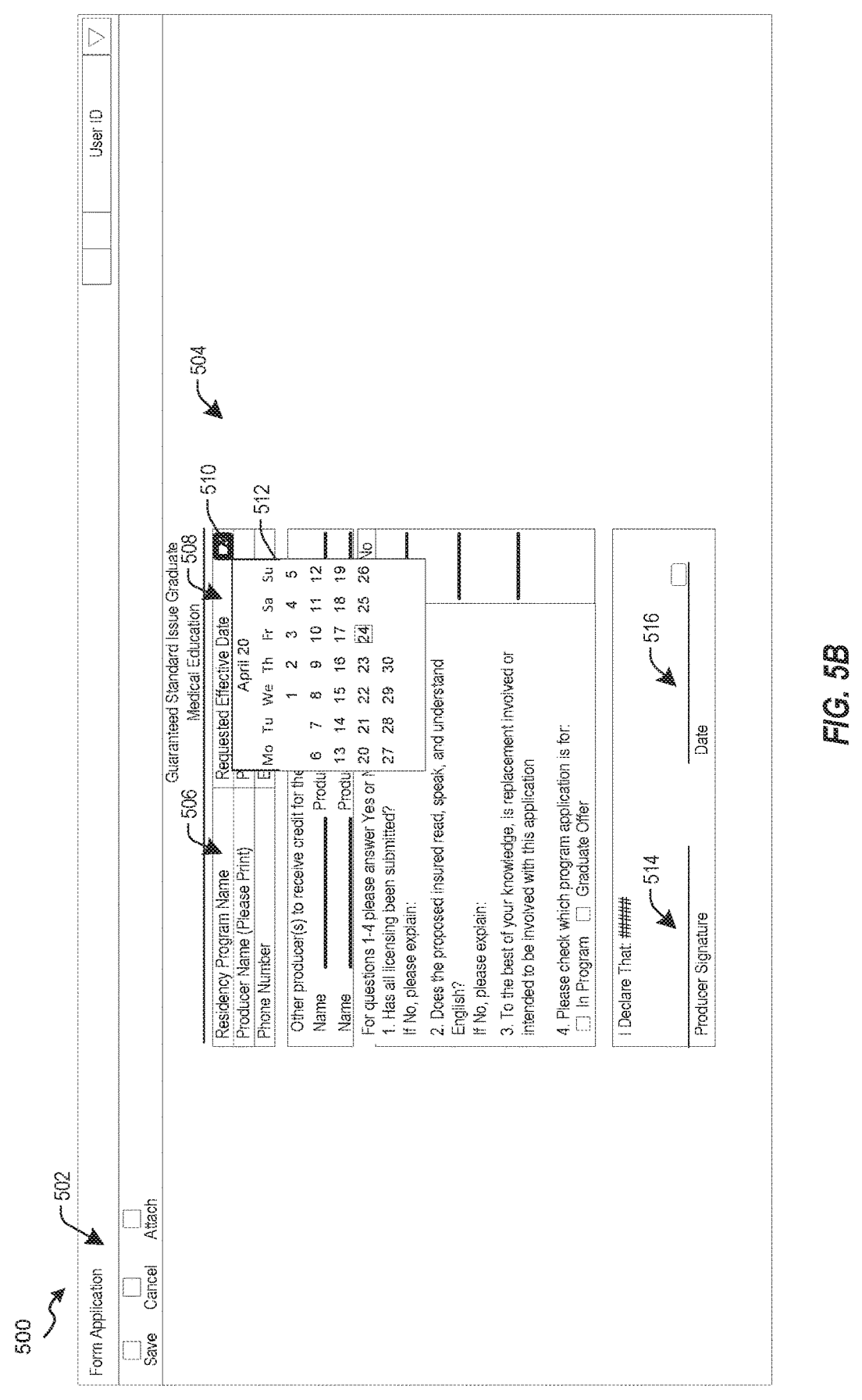

FIGS. 5A-5B depict views of an example of a UI (e.g., a GUI) of an electronic form application for enabling user filling of an electronic form according to some aspects of the present disclosure. In some implementations, the views of the UI shown in FIGS. 5A-5B may be generated by an output terminal, such as output terminal 162 of FIG. 1, when accessing a final version of an electronic form generated based on source document 300 of FIG. 3. The electronic form may be represented by an output file, as described with reference to FIGS. 1-2. Although shown as being displayed and filled using a particular electronic form application, in other implementations, the electronic form may be displayed and filled using publicly available software, such as a web browser or other HTML processing application.

FIG. 5A shows a first view of a UI 500. UI 500 may be configured to display the electronic form and to receive and store input data based on user input. UI 500 may include buttons 502 and a display pane 504. Buttons 502 may include buttons that enable general control of general operations associated with the electronic form. For example, buttons 502 may include a save button, a cancel button, an attach button, other buttons, or a combination thereof. The save button may enable any input data added to the electronic form to be saved (e.g., such as at a memory of the user terminal being used to access the electronic form). The cancel button may close the electronic form without saving any input data added to the electronic form. The attach button may enable submission of the electronic form, such as by providing the input data to a device or location associated with one or more submission parameters of the output file that represents the electronic form. Additionally or alternatively, the attach button may cause generation of one or more data structures indicating the input information for use in initiating a workflow or other operations.

Display pane 504 may be configured to display at least a portion of the electronic form represented by the output file (e.g., the final version of the electronic form). The displayed electronic form may include electronic form elements, such as text blocks (e.g., a header ("Producer Information Report Guaranteed Standard Issue Graduate Medical Education"), instructions or questions ("Other producer(s) to receive credit for these applications:", "For questions 1-4 please answer Yes or No", "Has all licensing been submitted?", "I Declare That", etc.), input fields (e.g., program name fields, date fields, producer name fields, producer number fields, phone number fields, e-mail address fields, signature fields, etc.), labels associated with the input fields ("Residency Program Name", "Requested Effective Date", "Producer Name", "Producer No.", "Agency", "Phone Number", "Email Address", "Producer Signature", "Date", etc.), interactive elements, other types of electronic form elements, or a combination thereof, as further described with reference to FIGS. 4A-4F. The elements of the electronic form shown in FIG. 5A may include particular illustrative elements including a residency program name field 506 and a requested effective date field 508.

One or more input fields of the electronic form may be configured to enable user entry of input information. For example, a user may select residency program name field 506 and may type in (e.g., using a keyboard) or otherwise enter a name for a residency program. As the user enters the name, the letters of the name may be displayed within display pane 504 (e.g., within the blank space of the box surrounding residency program name field 506). Additionally, one or more input fields (or other elements) of the electronic form may include interactive elements. For example, requested effective date field 508 may include a calendar icon 510 that, when selected by the user, causes a calendar window to be displayed for entering a date into requested effective date field 508.

FIG. 5B shows a second view of UI 500 after selection of the calendar icon 510 by a user. As shown in FIG. 5B, after selection of calendar icon 510, a calendar window 512 (e.g., a popup calendar window) may be displayed. Calendar window 512 may display dates corresponding to days of a current month. A user may click on (e.g., using a mouse or other user input device) or otherwise select a particular date in calendar window 512 to cause the selected date to be input into requested effective date field 508. Calendar window 512 may also include forward or back buttons for displaying a previous or subsequent month within calendar window 512. Upon selection of a date, calendar window 512 may close and the numeric form of the date may be automatically inserted in requested effective date field 508.

Other input fields (or other elements) may include other types of interactive elements, such as check boxes, buttons, clock icons that cause display of a timer window, list icons that cause display of a list of options, repeating tables that include buttons for adding rows or columns to the repeating tables, audio or visual elements, other interactive elements, or a combination thereof. Additionally or alternatively, one or more input fields may be linked to data sources to cause auto-population of the input fields. For example, a producer signature field 514 may be linked to a file location that stores a digital signature for the user. In such an example, the digital signature may be auto-populated in producer signature field 514 when the user opens the electronic form. As another example, a date field 516 may be linked to a date of the user terminal being used to access the electronic form. In such an example, a current date detected at the user terminal may be auto-populated in date field 516 when the user opens the electronic form.

Figure 6:
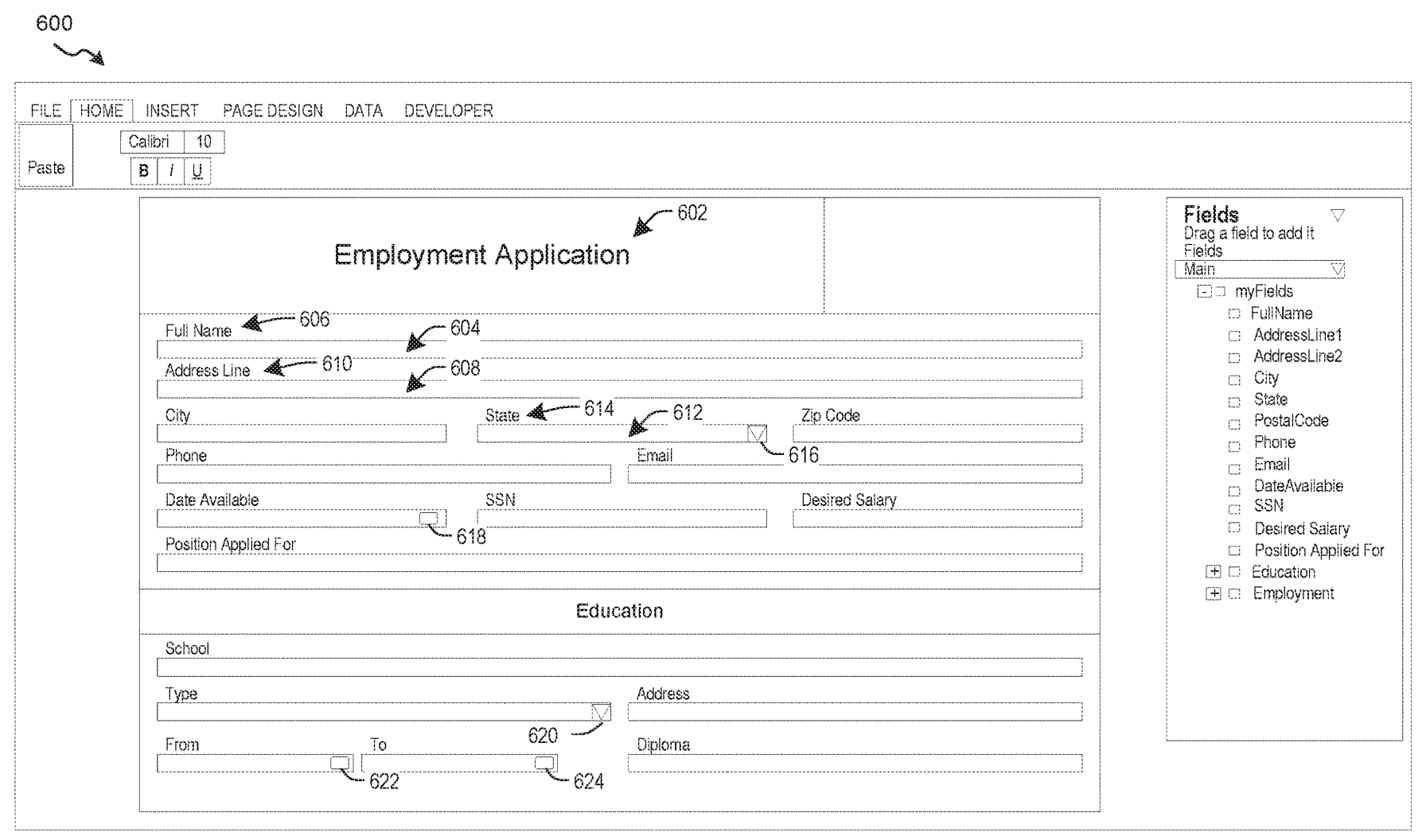

FIG. 6 depicts an example of a source document 600 according to some aspects of the present disclosure. In some implementations, source document 600 includes a legacy electronic form or another type of static electronic document that is generated by a user using an electronic document management application. In the particular illustrative example shown in FIG. 6, source document 600 is an employment application form. Additionally, in the particular example of FIG. 6, source document 600 is shown within a UI of an electronic document application management application. The electronic document management application may enable creation and modification of the electronic form based on user input, similar to the description of modification of the electronic form with reference to FIGS. 4A-4F. For example, the electronic document management application may include a toolbar that includes one or more menus of commands or controls for use with source document 600 (e.g., the illustrated paste command and font and text formatting controls). Additionally or alternatively, the electronic document management operation may include one or more windows that include information associated with source document 600, such as the illustrated fields window that includes a list of fields, and associated categories of fields, within source document 600. The electronic document management application may generate (and a file representing source document 600 may include) metadata indicating parameters or properties of the fields (or other elements) of source document 600.

As shown in FIG. 6, source document 600 may include a header 602, a first input field 604, a first label 606, a second input field 608, a second label 610, a third input field 612, and a third label 614. Source document 600 may also include one or more interactive elements, such as a first list icon 616, a first calendar icon 618, a second list icon 620, a second calendar icon 622, and a third calendar icon 624. Other elements of source document 600 are not identified for convenience. Header 602 may include or correspond to a title of source document 600, such as "Employment Application," as a non-limiting example shown in FIG. 6. First input field 604 is a box (e.g., a rectangle) designed for a user filling out source document 600 to enter information into. First label 606 includes a text block including information identifying or otherwise associated with first input field 604. In the particular example of FIG. 6, first label 606 includes the text "Full Name:", indicating that first input field 604 is a name field. Similarly, second input field 608 is another box designed for the user to enter information into, and second label 610 includes a text block including information identifying or otherwise associated with second input field 608. In the particular example of FIG. 6, second label 610 includes the text "Address Line", indicating that second input field 608 is an address field. Similarly, third input field 612 is another box designed for the user to enter information into, and third label 614 includes a text block including information identifying or otherwise associated with third input field 612. In the particular example of FIG. 6, third label 614 includes the text "State", indicating that third input field 612 is a state field.

One or more of the input fields (or other elements) of source document 600 may include interactive elements. For example, third input field 612 may include first list icon 616, an available date field may include first calendar icon 618, a school type field may include second list icon 620, a starting date field may include second calendar icon 622, and an ending date field may include third calendar icon 624. Selection of one of calendar icons 618, 622, and 624 in a final version of the electronic form (e.g., an electronic form represented by an output file) may cause display of a calendar window for selecting a date for entry in the respective date field, as described with reference to FIGS. 5A-5B. Selection of one of the list icons 616 and 620 in the final version of the electronic form may cause display of a list of selectable responses for selecting an entry in the respective input field, as further described herein with reference to FIGS. 7A-7B. The above-described examples are illustrative, and in other implementations, other interactive icons that perform other operations may be included in source document 600.

During an electronic form generation process based on source document 600, one or more of the elements may be identified based on the metadata included in source document 600. For example, first input field 604 may be identified and included in an electronic form represented by an intermediate file based on one or more associated parameters indicated in the metadata. Similarly, other elements (e.g., text blocks, input fields, interactive elements, tables, etc.) may be identified and included in the electronic form represented by the intermediate file based on associated parameters indicated in the metadata. In this manner, source document 600 may be converted into an electronic form represented by an intermediate file, as further described with reference to FIGS. 1-2. Converting source document 600 based on the metadata (e.g., without performing element detection on source document 600), may increase speed and reduce processing resources used to convert source document 600 to the intermediate file. The electronic document represented by the intermediate file may be displayed an modified by an interactive tool, as described with reference to FIGS. 4A-4F, and may then be converted to an output file, as described with reference to FIGS. 1-2.

Figure 7A:
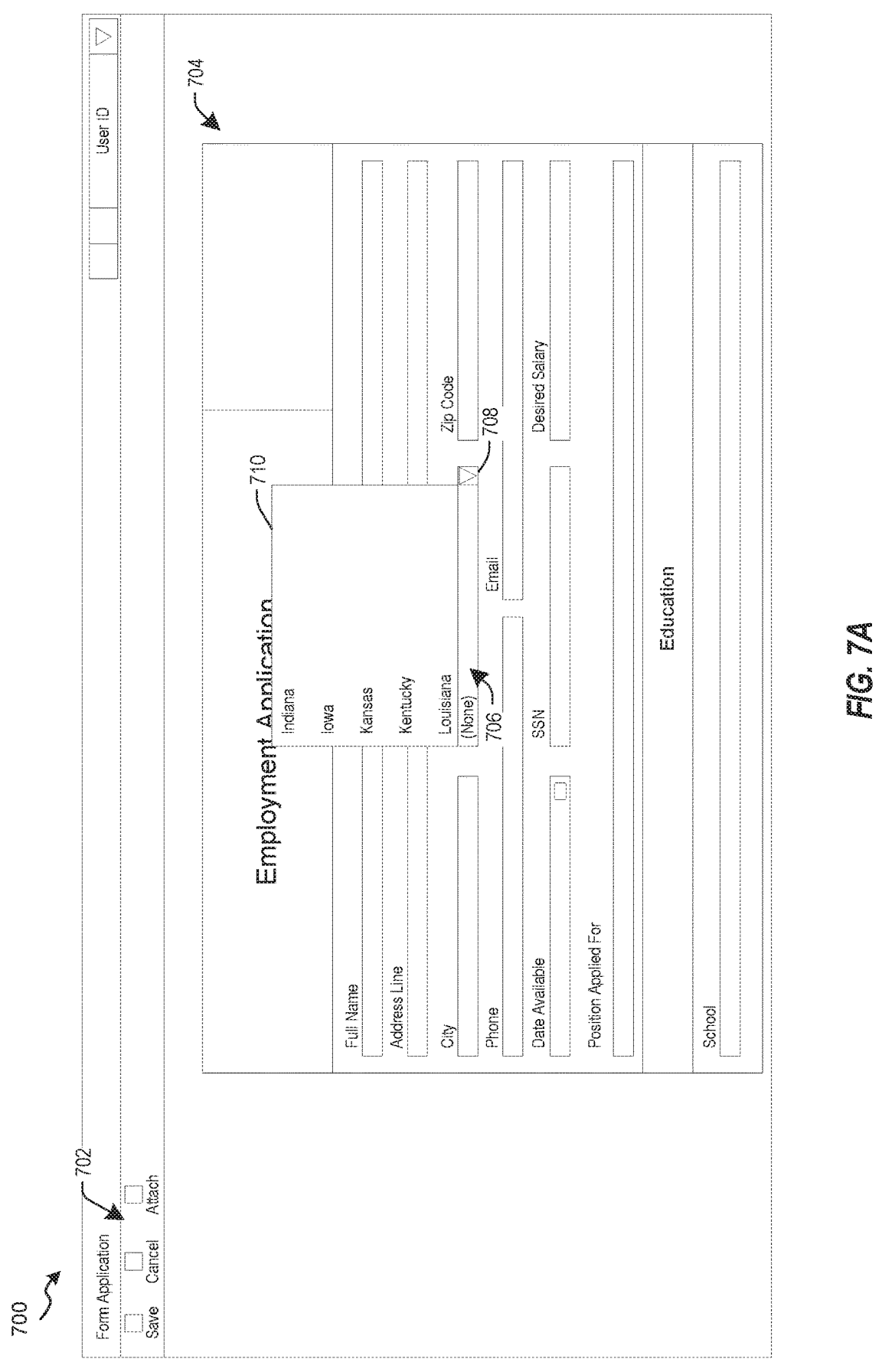
Figure 7B:
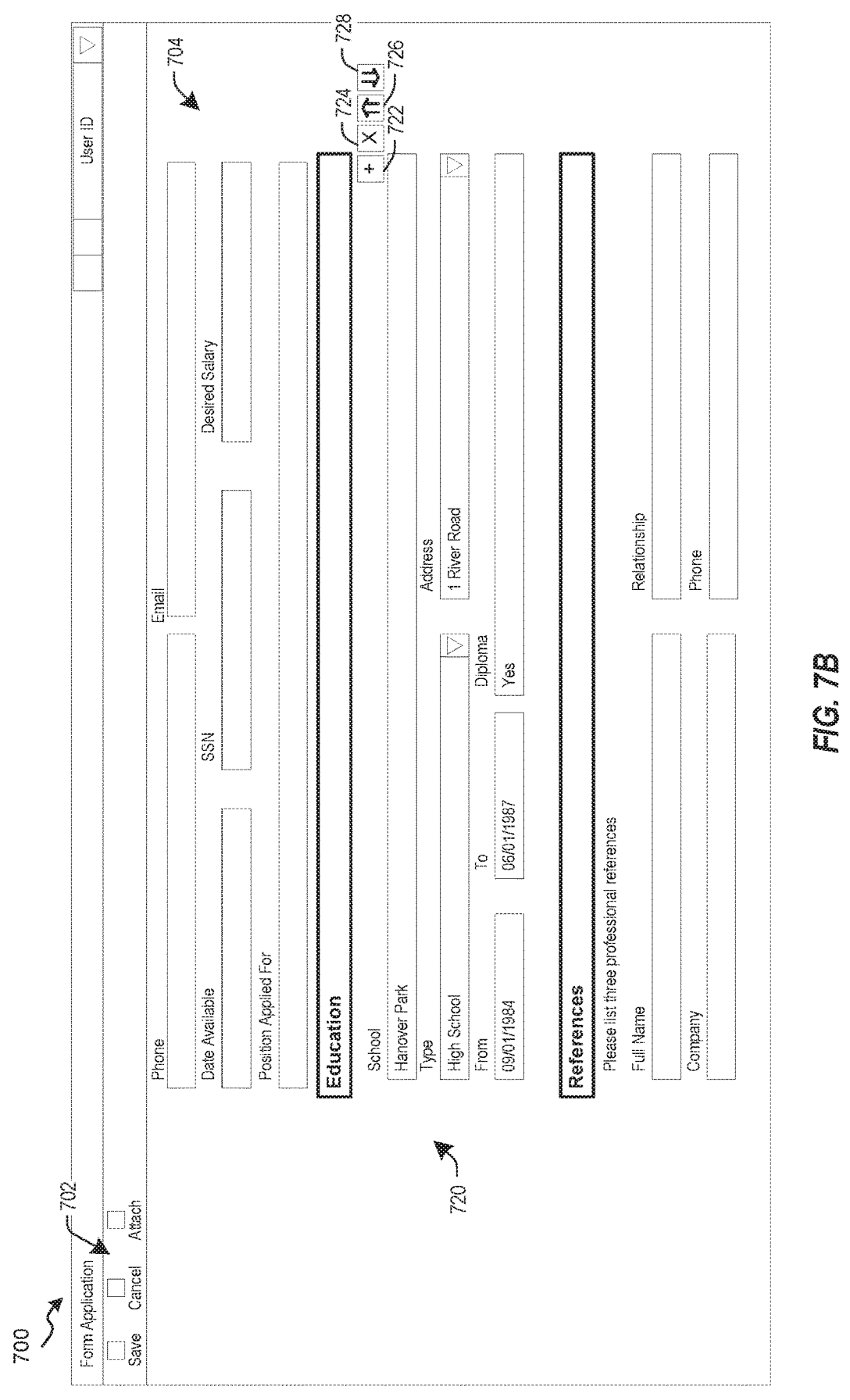

FIGS. 7A-7B depict views of an example of a UI (e.g., a GUI) of an electronic form application for enabling user filling of an electronic form according to some aspects of the present disclosure. In some implementations, the views of the UI shown in FIGS. 7A-7B may be generated by an output terminal, such as output terminal 162 of FIG. 1, when accessing a final version of an electronic form generated based on source document 600 of FIG. 6. The electronic form may be represented by an output file, as described with reference to FIGS. 1-2. Although shown as being displayed and filled using a particular electronic form application, in other implementations, the electronic form may be displayed and filled using publicly available software, such as a web browser or other HTML processing application.

FIG. 7A shows a first view of a UI 700. UI 700 may be configured to display the electronic form and to receive and store input data based on user input. UI 700 may include buttons 702 and a display pane 704. Buttons 702 may include buttons that enable control of general operations associated with the electronic form, such as a save button, a cancel button, and an attach button, as described with reference to FIG. 5A. Display pane 704 may be configured to display at least a portion of the electronic form represented by the output file (e.g., the final version of the electronic form). The displayed electronic form may include electronic form elements, such as text blocks, instructions or questions, input fields, labels associated with the input fields, interactive elements, other types of electronic form elements, or a combination thereof, as further described with reference to FIGS. 4A-4F. The elements of the electronic form shown in FIG. 7A may include particular illustrative elements including a state field 706.

One or more input fields of the electronic form may be configured to enable user entry of input information. For example, a user may select a name field and may type in (e.g., using a keyboard) or otherwise enter a name for inclusion in the name field. As the user enters the name, the letters of the name may be displayed within display pane 704 (e.g., within the blank space of the box surrounding the name field). Additionally, one or more input fields (or other elements) of the electronic form may include interactive elements. For example, state field 706 may include a list icon 708 that, when selected by the user, causes a list 710 (e.g., a list popup) to be displayed for entering a selected response into state field 706. For example, list 710 may include each of the fifty states in the United States, and the list may be scrollable (if an entirety of the list is not displayed), to enable user selection of a state. Upon selection of one of the states in list 710, list 710 is closed and the name of the selected state is automatically entered into state field 706. In this manner, list icons may be used to cause display of a list of possible responses for input fields having a limited set of acceptable responses. Alternatively, the list may include a user-fillable selection to enable the user to enter a response that is not included in the list.

FIG. 7B shows a second view of UI 700 after a user scrolls down with respect to the first view shown in FIG. 7A. As shown in FIG. 7B, the electronic form may include a repeating table 720. Repeating tables include tables that may have a variable number of entries based on user input (e.g., tables that do not have a fixed number of entries). UI 700 may be configured to add or remove entries from repeating table 720 based on user input. Each repeating table may have a header or label and one or more entries, and each entry may include one or more sub-entries. In the example of FIG. 7B, repeating table 720 is has a label that includes the text "Education" and displays one entry (or entry group) at a time, where each entry includes a school name input field, a school type input field, a school address input field, a starting date field, an ending date field, and a diploma field. Each of the sub-entries (e.g., each of the school name input field, the school type input field, the school address input field, the starting date field, the ending date field, and the diploma field) may be filled in by a user, such as by typing in information, selecting a response using a corresponding list icon, and selecting a date using a corresponding calendar icon, as described above.

Additionally, UI 700 may include one or more buttons nearby to repeating table 720 to enable control of aspects of repeating table 720. The one or more buttons may include an add entry button 722, a delete entry button 724, a scroll up button 726, and a scroll down button 728, as non-limiting examples. User selection of add entry button 722 may cause a new entry (including corresponding sub-entries or input fields) to be added to repeating table 720. The new entry may be added with no input in the corresponding input fields or with default values in the corresponding input fields. User selection of delete entry button 724 may cause a selected or displayed entry, including corresponding sub-entries or input fields, to be deleted from repeating table 720. User selection of scroll up button 726 may cause a previous entry, including corresponding sub-entries or input fields, of repeating table 720 to be displayed. User selection of scroll down button 728 may cause a subsequent entry, including corresponding sub-entries or input fields, of repeating table 720 to be displayed. In some implementations, UI 700 displays only a single entry (or entry group) of repeating table 720 at one time. In some other implementations, UI 700 displays multiple entries (or entry groups) of repeating table 720 at one time, such as by increasing the vertical dimensions of the electronic form (and scroll up button 726 and scroll down button 728 may not be included). In some implementations, a child data structure (e.g., an array, a table, a list, or the like) may be generated for storing input information received with respect to a repeating table.

Figure 8:
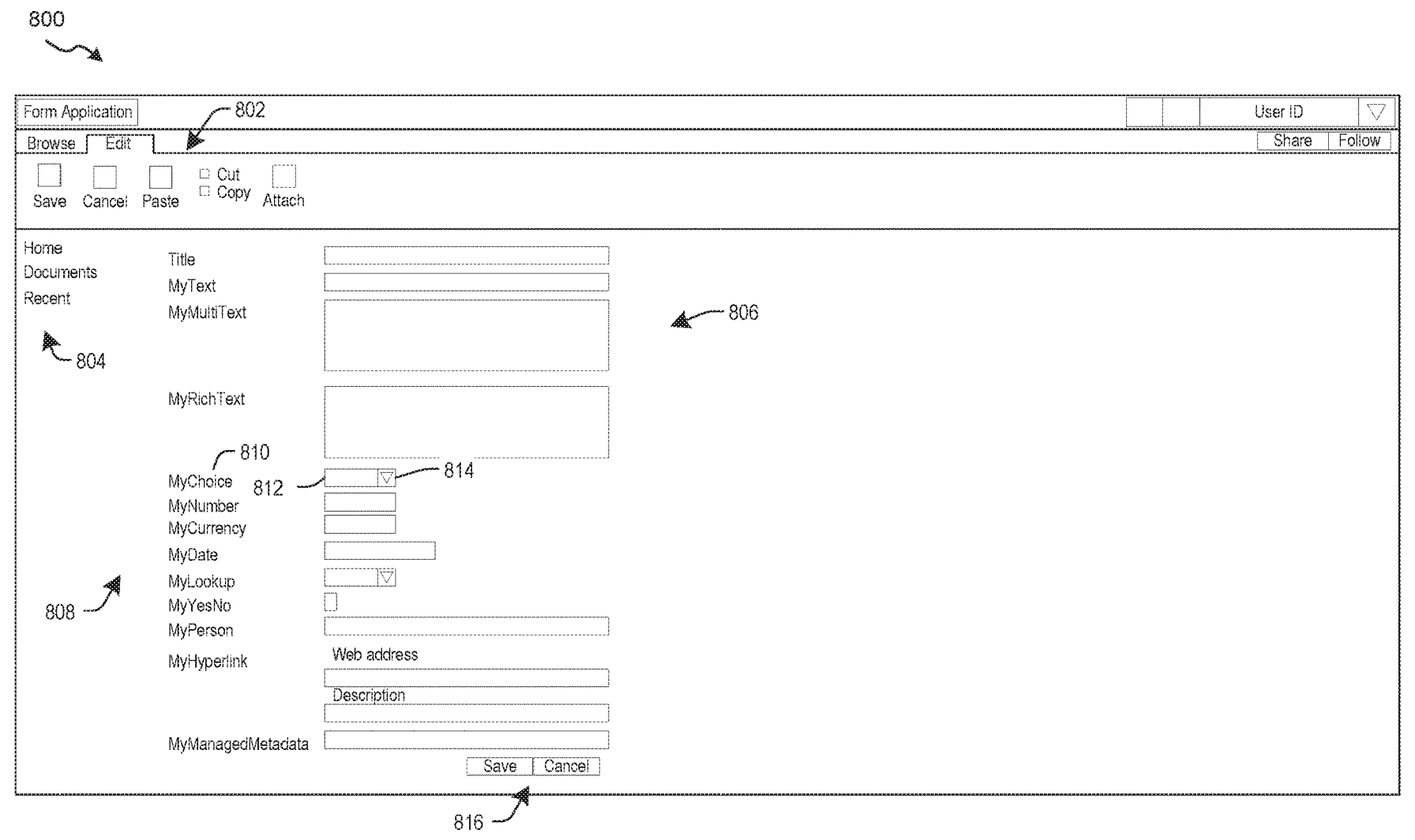

FIG. 8 depicts an example of a UI 800 (e.g., a GUI) of an electronic form application for enabling user filling of an electronic form according to some aspects of the present disclosure. In some implementations, the UI shown in FIG. 8 may be generated by an output terminal, such as output terminal 162 of FIG. 1, when accessing an electronic form generated based on one or more data structures. In a particular non-limiting example, the electronic from application is SharePoint, and the data structure is a SharePoint list. In other implementations, the electronic form application may be a different electronic form application (or electronic document management application), and the data structure may be a different type of data structure, such as a structured query language (SQL) table, as a non-limiting example. In some implementations, the one or more data structures include a list of labeled fields for storing input information.

UI 800 may include buttons 802, navigation links 804, and a display pane 806. Buttons 802 may include buttons that enable control of general operations associated with the electronic form. For example, buttons 802 may include a save button, a cancel button, cut, copy, and past buttons, an attach button, other buttons, or a combination thereof. The save button may enable any input data added to the electronic form to be saved (e.g., such as at a memory of the user terminal being used to access the electronic form). The cancel button may close the electronic form without saving any input data added to the electronic form. The cut, copy, and paste buttons may enable text input to the electronic form to be removed or copied to another input field. The attach button may enable submission of the electronic form, such as by providing the input data to a device or location associated with one or more submission parameters of the output file that represents the electronic form. Additionally or alternatively, the attach button may cause generation of one or more data structures indicating the input information. Navigation links 804 may provide navigation to other pages or displays of the electronic form application. For example, navigation links 804 may include a link to a home page (e.g., a landing page) of the electronic form application, a link to documents page that displays documents that may be accessed by the electronic form application, a link to a recently accessed documents page that displays recently accessed documents by the electronic form application, other navigation links, or a combination thereof.

Display pane 806 may be configured to display at least a portion of the electronic form represented by the one or more data structures. In some implementations, the electronic form application may be configured to generate a "basic" electronic form that only includes labels and input fields. For example, the electronic form application may convert the labeled fields of the one or more data structures to input fields and corresponding labels. To illustrate, the electronic form may include elements 808 that include a column of labels and a column of corresponding input fields. Elements 808 may include illustrative label 810, which includes the text "MyChoice," and input field 812, which may be formatted to receive a limited set of possible responses. In some implementations, the electronic form application may be configured to generate one or more interactive elements, such as list icon 814, to enable a user to input responses into the input fields. Additionally, display pane 806 may include additional buttons 816, such as a save button and a cancel button, for saving input data that is input into the electronic form or for discarding input data that is input into the electronic form.

Figure 9:
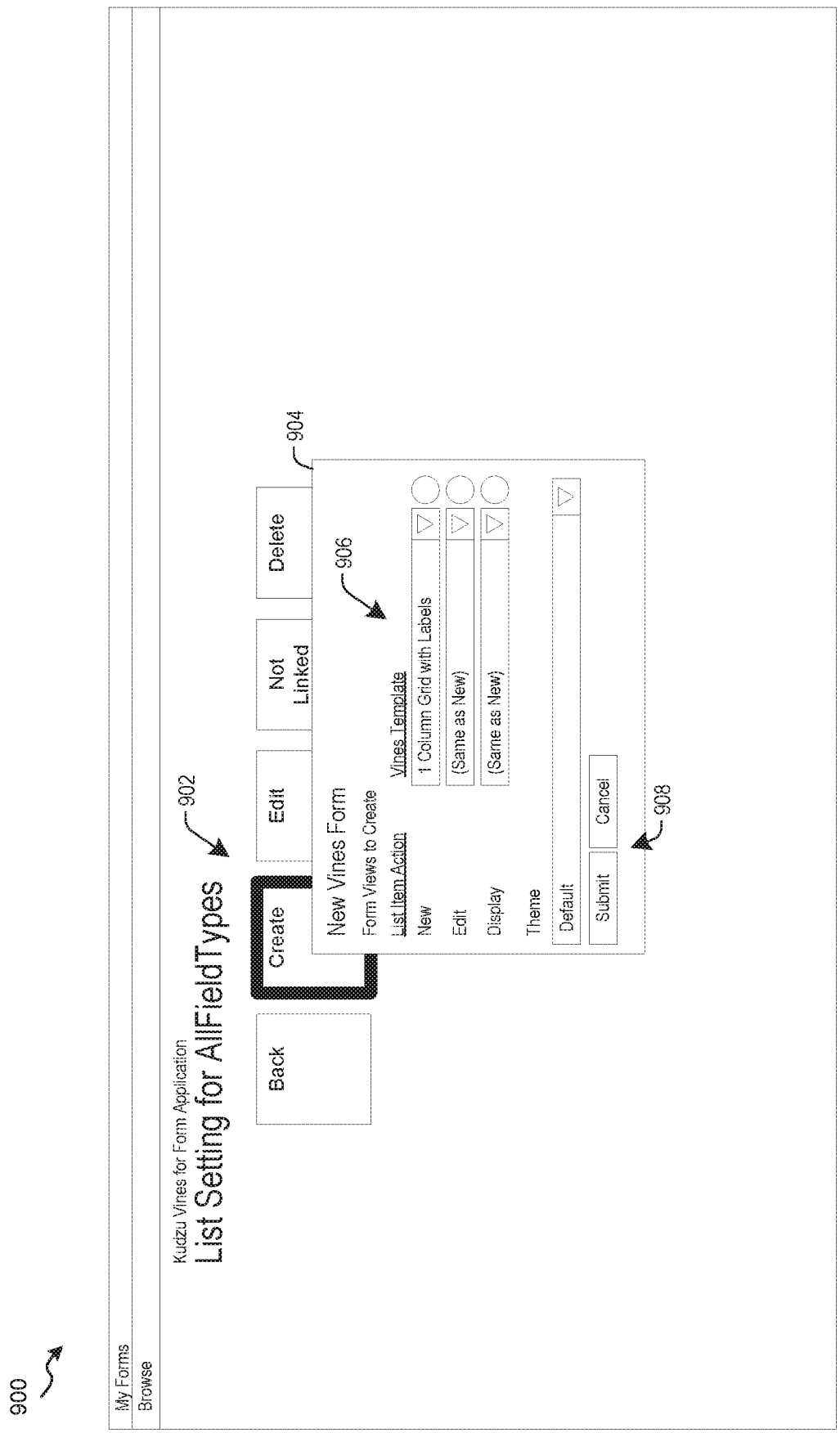

FIGS. 9 and 10 depict examples of UIs (e.g., GUIs) displayed by the electronic form application of FIG. 8 to enable generation of an intermediate file representing an electronic form, as described with reference to FIGS. 1-2 and 4A-4F. In some implementations, the techniques of the present disclosure provide application programming interfaces (APIs) configured to enable performance and/or support of one or more features of the present disclosure by third party electronic form applications. As a particular example, the system 100 of FIG. 1 (e.g., the server 110) may be configured to provide an API for interfacing the electronic form generation and modification processes described with reference to FIGS. 1-2 with SharePoint. In such implementations, a user of the electronic form application may be able to access functionality described herein from within the electronic form application.

FIG. 9 depicts a UI 900. UI 900 may include or correspond to a data structure control menu. UI 900 may include options 902 for controlling aspects of a data structure (e.g., a SharePoint list, an SQL table, or the like) accessed by the electronic form application. For example, options 902 may include a back option, a create option, an edit option, a link option, a delete option, other options, or a combination thereof. The back option may return to a previous screen of the electronic form application. The create option may enable creation of a new electronic form based on the data structure. The edit option may enable editing of the data structure. The linked button may enable linking a data source to the data structure. The delete option may enable deletion of the data structure. The options may be selected based on user input, such as a user clicking on a selected option with a mouse or other user input device.

Responsive to selection of the create option, UI 900 may display a new form window 904 (e.g., a popup window). New form window 904 may include form options 906 for configuring generation of a new electronic form represented by an intermediate file based on the data structure. This process may also be referred to as making the data structure "Kudzu-aware." Form options 906 may include a new template, an edit template, a display template, a theme, other options, or a combination thereof. The new template may include or correspond to an electronic form template used to generate the electronic form based on the data structure. The edit template may include or correspond to an electronic form template used for editing the electronic form. The display template may include or correspond to an electronic template used for displaying the electronic form. The theme may include or correspond to one or more visual settings, text settings, or other formatting settings associated with the electronic form. Each of the new template, the edit template, the display template, and the theme may be selectable from one or more options by the user. Additionally, new form window 904 may include buttons 908 for initiating or preventing electronic form generation. For example, buttons 908 may include a submit button for initiating generation of the electronic form and a cancel button for preventing generation of the electronic form.

FIG. 10 depicts a UI 1000. UI 1000 may include or correspond to UI 900 after selection of the submit button displayed in FIG. 9. UI 1000 may include a configure template window 1002 (e.g., a popup window) for controlling aspects of a template used to generate the electronic form. Configure template window 1002 may include a list of fields 1004, a list of labels 1006 corresponding to the fields, and a list of control types 1008 corresponding to the fields. List of fields 1004 may be populated with each field included in the data structure from which the electronic form is being generated. For example, list of fields 1004 may include a list of the labels of each of the fields included in the data structure, and optionally a selectable indicator configured to enable inclusion of the particular field in the electronic form. List of labels 1006 may include the label corresponding to each field in list of fields 1004. The default values of the labels in list of labels 1006 may be the same as the names of the fields in list of fields 1004. However, each label in list of labels 1006 may be displayed in a text box that enables a user to edit or modify the corresponding label. List of control types 1008 may include the control type corresponding to each field in list of fields 1004. The default values of the control types in list of control types 1008 may be a particular control type (e.g., text box), or a control type based on the data structure. However each control type in list of control types 1008 may be displayed in a text box or other interactive element, such as a list field with a list icon, that enables the user to select a desired control type for each of the fields. Configure template window 1002 may also include buttons 1010 for initiating or preventing electronic form generation. For example, buttons 1010 may include a submit button for initiating generation of the electronic form and a cancel button for preventing generation of the electronic form.

Figure 11:
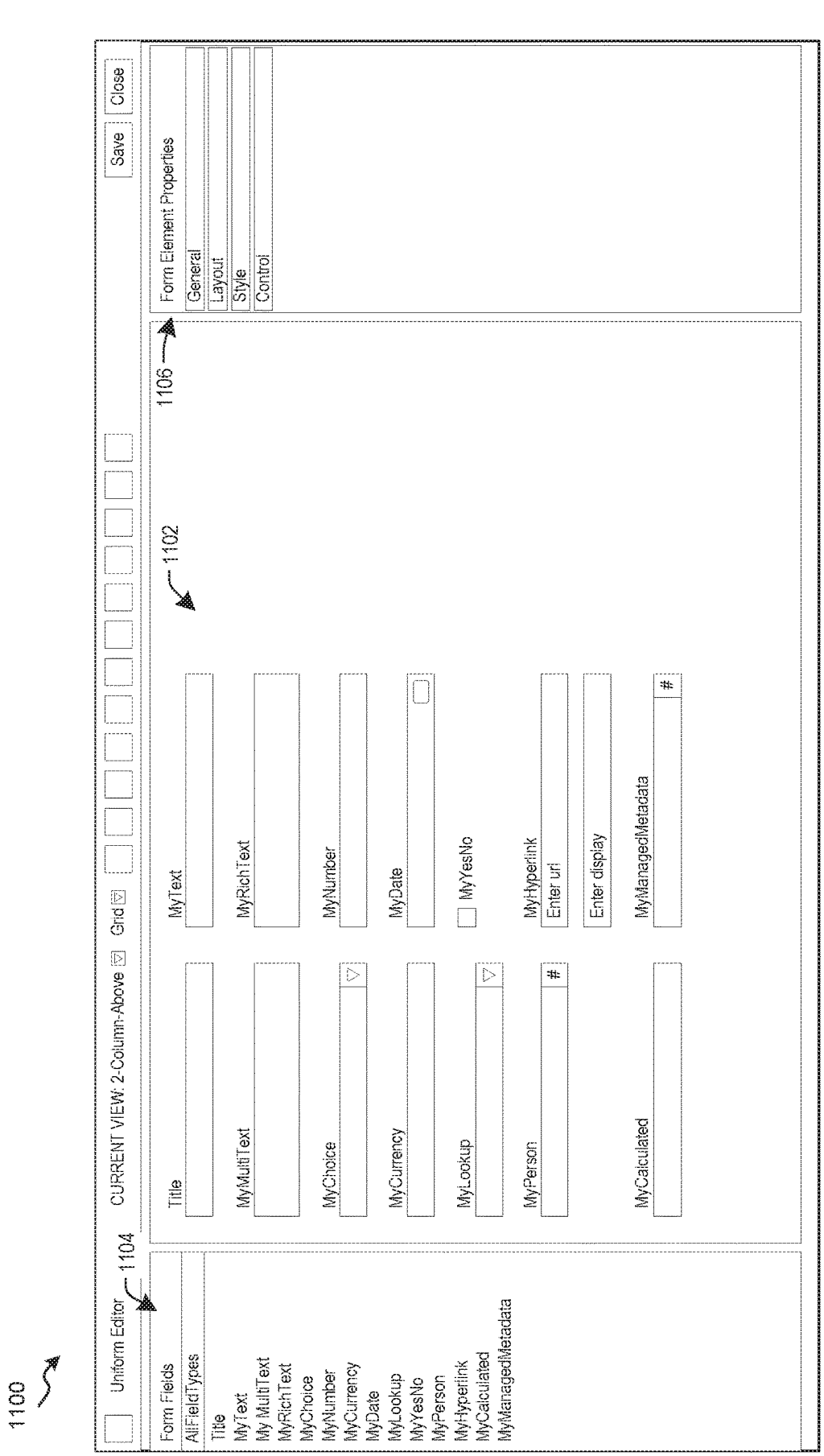
FIG. 11 shows another example of a UI for supporting display and modification of an electronic form according to some aspects of the present disclosure.

FIG. 11 depicts an example of a UI 1100 (e.g., a GUI) for supporting display and modification of an electronic form according to some aspects of the present disclosure. In some implementations, UI 1100 may be generated by UI manager 125 of FIG. 1 and included in or displayed by an interactive tool managed by interactive tool manager 123 of FIG. 1 to enable display and modification of an electronic form based on one or more data structures, as described with reference to FIGS. 8-10. For example, the interactive form may be modified based on user input received responsive to UI 1100. The electronic form may be represented by an intermediate file, as described with reference to FIGS. 1-2. UI 1100 may be similar to UI 400 as described with reference to FIGS. 4A-4F.

UI 1100 may include buttons (e.g., view buttons, a save button, a close button, and the like), a display pane 1102, a list of form fields 1104, and form element properties 1106. Display pane 1102 may be configured to display at least a portion of the electronic form represented by the intermediate file (e.g., the electronic form generated based on the one or more data structures). The displayed electronic form may include electronic form elements, such as text blocks, input fields, interactive elements, other types of electronic form elements, or a combination thereof, as further described with reference to FIGS. 1-2 and 4A-4F. List of form fields 1104 includes a list of identifiers of the various fields included in the electronic form. Selection of one of the field identifiers from list of form fields 1104 may cause selection (e.g., highlighting) of the corresponding field in display pane 1102. Form element properties 1106 may indicate one or more properties or parameters of a selected element within display pane 1102. Form element properties 1106 may include general properties, layout properties, style properties, control properties, other properties, or a combination thereof, as described with reference to FIGS. 4A-4F. In the example of FIG. 11, no element is selected, resulting in no specific properties being displayed in form element properties 1106.

UI 1100 may be configured to enable modification of the electronic form based on user input. For example, the user may move elements to different locations within display pane 1102, add new elements or delete existing elements, or modify properties or parameters associated with a selected element via form element properties 1106, as described with reference to FIGS. 4A-4F. In this manner, a user may create a more pleasing user experience for the electronic form than for an electronic form that is generated automatically by the electronic form application, as shown in FIG. 8.

FIG. 12 depicts an example of a UI 1200 (e.g., a GUI) displayed by the electronic form application of FIG. 8 to enable generation of an output file representing the electronic form described with reference to FIG. 11. UI 1200 may include or correspond to an electronic form control menu. UI 1200 may include a menu 1202 configured to enable control of various aspects of publishing the electronic form (e.g., generating the output file). For example, menu 1202 may include configuration options 1204, editing options 1206, publishing options 1208, other options, or a combination thereof. Configuration options 1204 include options or controls for controlling aspects of one or more data structures that are to be generated for storing input information associated with the electronic form. For example, configuration options 1204 may include an option for specifying the one or more data structures to be created, an option for naming the one or more data structures, an option for selecting a theme associated with the electronic form, options for controlling a number of views associated with the electronic form, and options for controlling a source view or template for the electronic form, as non-limiting examples. Configuration options 1204 may be used to set one or more submission parameters of the output file (e.g., the published electronic form). Editing options 1206 include options or controls for editing aspects of the electronic form, such as properties of input fields or elements, layout of the electronic form, or the like. In some implementations, editing options 1206 may include a button for initiating the interactive tool for displaying and modifying the electronic form, as described with reference to FIG. 11. Publishing options 1208 include options or controls for controlling aspects of the publishing process (e.g., the output file generation process). For example, publishing options 1208 may include an option for enabling existing data structures to be overwritten by the one or more data structures created when the electronic form is published, or other options. In some implementations, menu 1202 includes a publish button for initiating the publishing process and a cancel button for preventing the electronic form from being published.

Figure 13A:
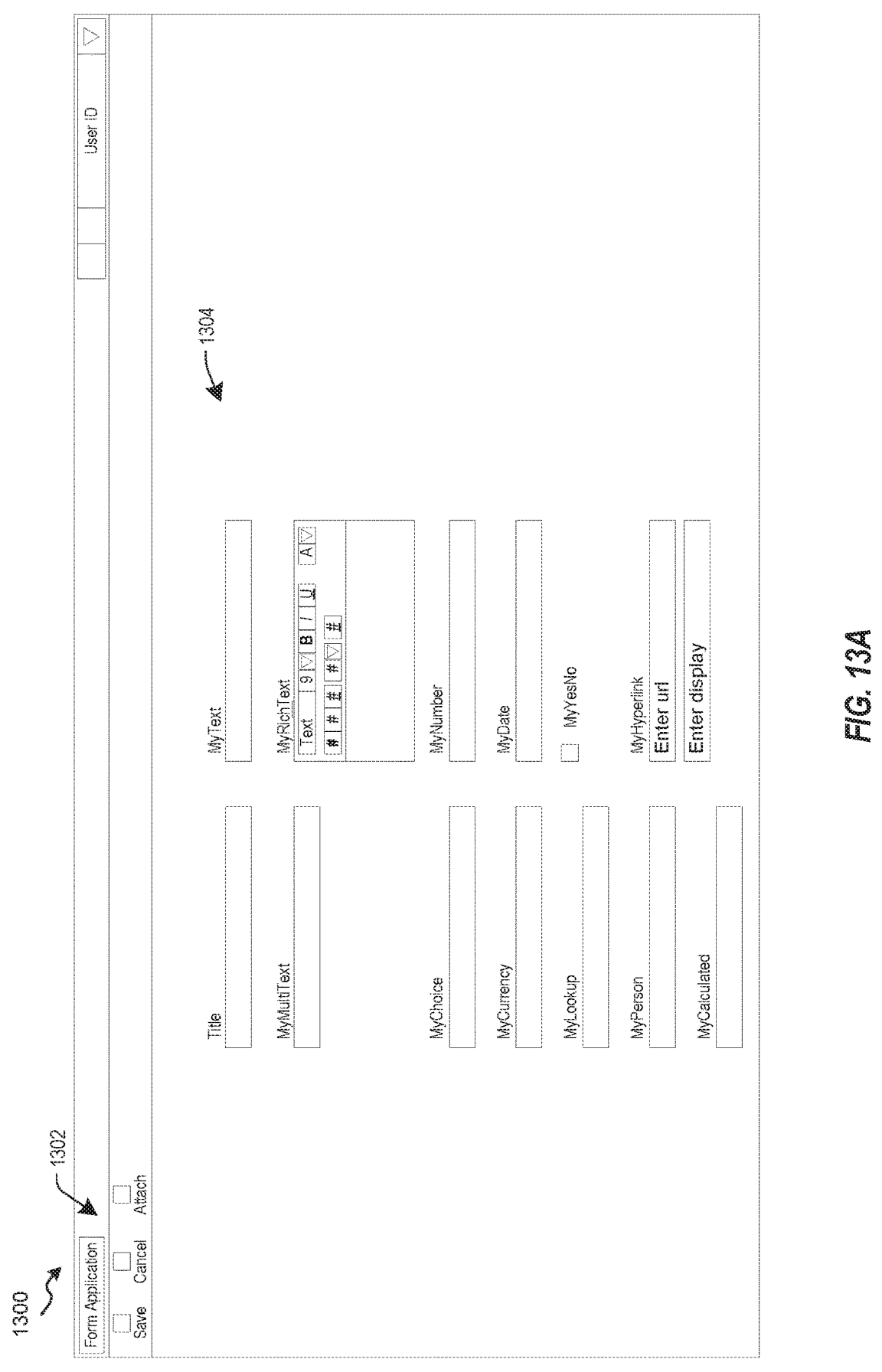
Figure 13B:
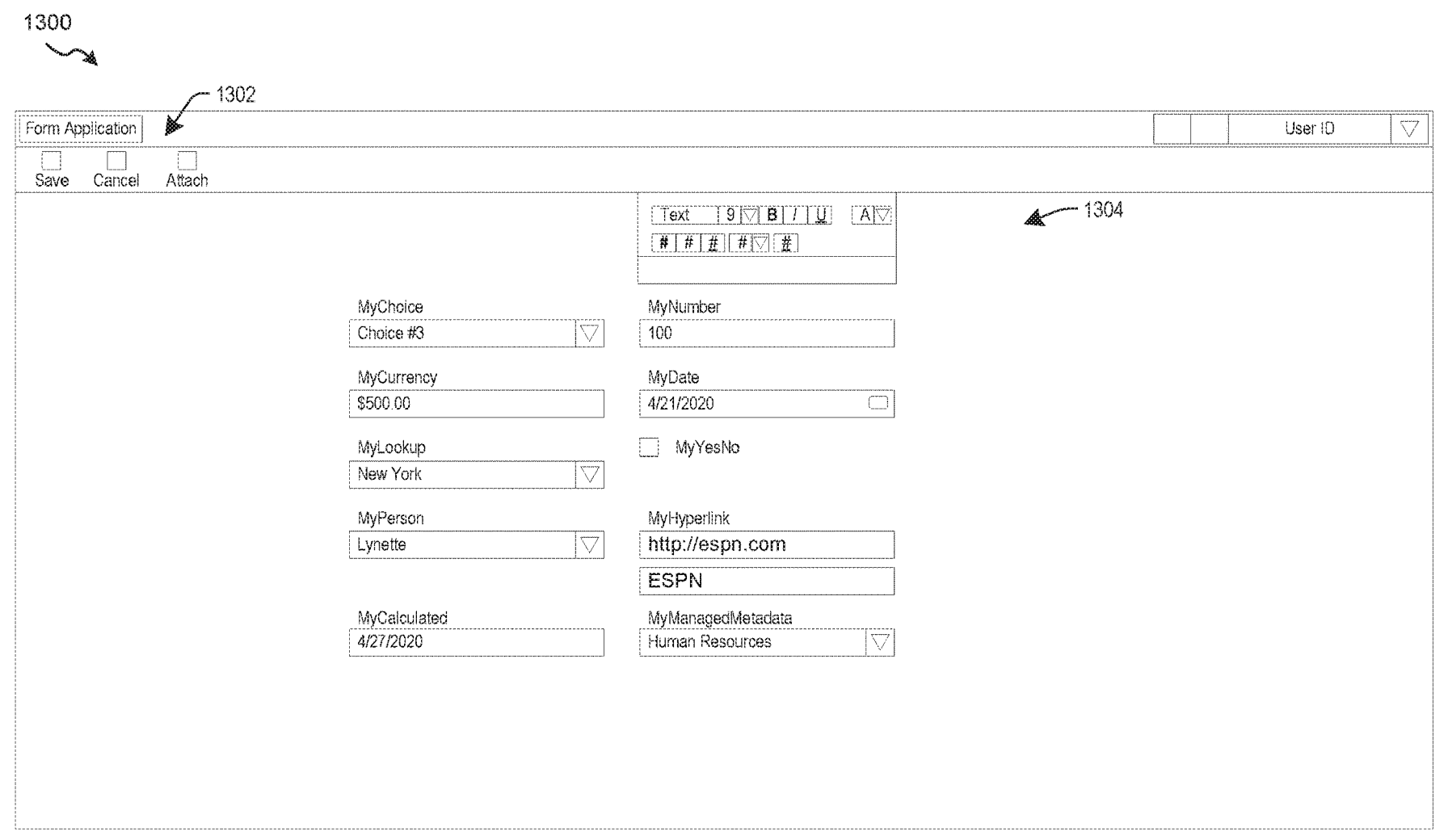

FIGS. 13A-13B depict views of an example UI (e.g., a GUI) displayed by an electronic form application for enabling user filling of an electronic form according to some aspects of the present disclosure. In some implementations, the UI described with reference to FIGS. 13A-13B is displayed by the electronic form application described with reference to FIG. 8 based on the electronic form modified as described with reference to FIG. 11 and published as described with reference to FIG. 12. The electronic form displayed within the UI of FIGS. 13A-13B may be configured to store the input information as a data structure. In a particular non-limiting example, the electronic from application is SharePoint, the electronic form is originally generated based on a SharePoint list, and the electronic form is configured to store the input information in the SharePoint list. In other implementations, the electronic form application may be a different electronic form application (or electronic document management application), and the data structure may be a different type of data structure, such as a SQL table, as a non-limiting example.

FIG. 13A shows a first view of UI 1300. UI 1300 may include buttons 1302 and a display pane 1304. Buttons 1302 may include buttons that enable control of general operations associated with the electronic form. For example, buttons 1302 may include a save button, a cancel button, an attach button, other buttons, or a combination thereof. The save button may enable any input data added to the electronic form to be saved (e.g., such as at a memory of the user terminal being used to access the electronic form). The cancel button may close the electronic form without saving any input data added to the electronic form. The attach button may enable submission of the electronic form, such as by providing the input data to a device or location associated with one or more submission parameters of the output file that represents the electronic form. Additionally or alternatively, the attach button may cause generation of the one or more data structures including the input information. In some implementations, UI 1300 may also include navigation links, as further described with reference to FIG. 8.

Display pane 1304 may be configured to display at least a portion of the electronic form. The electronic form shown in FIG. 13A may provide a more pleasing user experience than the basic electronic form shown in FIG. 8, for example, due to modifications performed to the intermediate electronic file as described with reference to FIG. 11, such as changing locations of elements, addition of interactive elements, modification of properties of the elements, or the like. For example, the labels may be moved to be above the corresponding input fields, some of the input fields may be moved to form a second column, and interactive font options may be displayed for the MyRichText input field, as non-limiting examples. In some implementations, the various input fields may be displayed as empty or with a default value, such as "Enter url" and "Enter display" for the MyHyperlink field. A user may be able to enter the input information into the various fields by selecting fields within display pane 1304 and entering text or interacting with interactive elements to select responses, as described above.

FIG. 13B shows a second view of UI 1300 which has been zoomed in, scrolled down. The second view shows UI 1300 after the input information has been added to some of the input fields. Some of the input fields may be filled in by the user by entering text. For example, the user may enter text for responses to the MyCurrency input field, the MyCalculated input field, and the MyHyperlink input field. At least some of these input fields may be formatted. As a particular example, the MyCurrency input field may be formatted to display a number with a leading $ and with a decimal point followed by two digits. Additionally or alternatively, some of these input fields may be filled in via user interaction with interactive elements. For example, the user may select a list icon to cause display of a list of entries from which the user may select a desired entry for the MyChoice input field, the MyLookup input field, the MyPerson input field, or the MyManagedMetadata input field. As another example, the user may select a calendar icon to cause display of a calendar from which the user may select a desired date for the MyDate input field. As another example, the user may select to fill in (or leave blank) a check box for the MyYesNo input field. Thus, the electronic form shown in FIGS. 13A-13B may be more interactive and more visually pleasing than the electronic form shown in FIG. 8, which improves a user experience associated with the electronic form shown in FIGS. 13A-13B.

Figure 14:
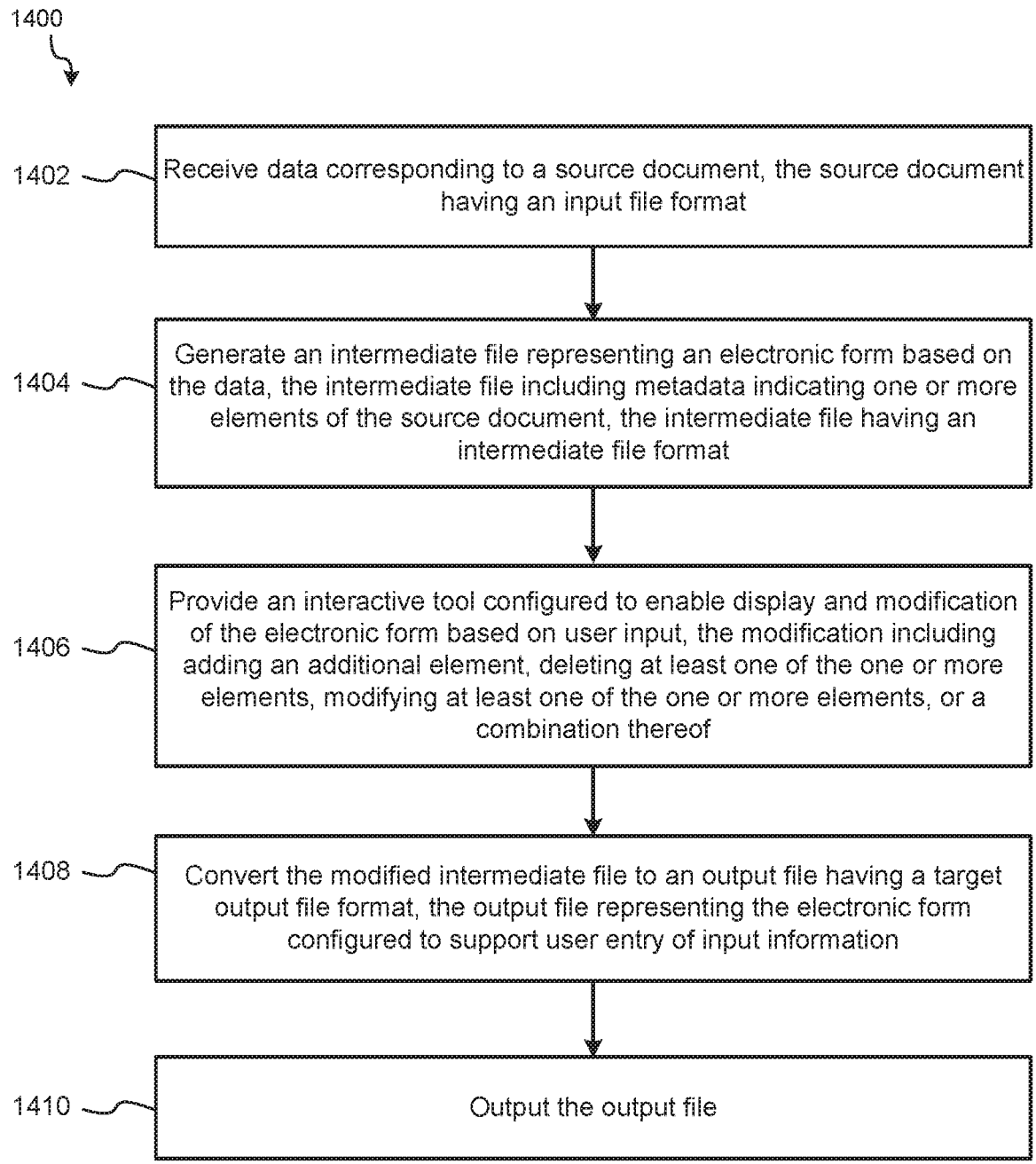
FIG. 14 is a flow chart of an example of a method of providing an interactive tool for displaying and modifying an electronic form according to some aspects of the present disclosure.

FIG. 14 is a flow diagram of a method 1400 of providing an interactive tool for displaying and modifying an electronic form according to some aspects of the present disclosure. In some implementations, the method 1400 may be performed by system 100 of FIG. 1.

Method 1400 includes receiving data corresponding to a source document, at 1402. The source document may have an input file format. For example, server 110 may receive a source document from data sources 170 via network 180. The received source document may have an input file format. Method 1400 also includes generating an intermediate file representing an electronic form based on the data, at 1404. The intermediate file may include metadata indicating one or more elements of the source document, and the intermediate file may have an intermediate file format. For example, intermediate electronic form generator 122 may generate an intermediate file that represents an electronic form and that includes one or more elements of the source document. The intermediate file may have an intermediate file format.

Method 1400 includes providing an interactive tool configured to enable display and modification of the electronic form based on user input, at 1406. The modification may include adding an additional element, deleting at least one of the one or more elements, modifying at least one of the one or more elements, or a combination thereof. For example, interactive tool manager 123 may provide and manage an interactive tool to enable display and modification of the electronic form. The interactive tool may include or display one or more UIs provided by UI manager 125.

Method 1400 also includes converting the modified intermediate file to an output file having a target output file format, at 1408. The output file may represent the electronic form configured to support user entry of information. For example, file converter 124 may convert the intermediate file generated by intermediate electronic form generator 122 to an output file having the target output file format. The output file may represent the electronic form, configured in accordance with one or more rules or protocols associated with the target output file format. Method 1400 further includes outputting the output file, at 1410. For example, file converter 124 may output the output file for storage, either at server 110 or another device, or for distribution to one or more other devices, such as output terminal 162.

In some implementations, the source document may include a legacy electronic form or a static electronic document. For example, the source document may include a pdf file generated by scanning in a paper document. Alternatively, the source document may include or correspond to an electronic document generated by a word processing application or document management application. The source document may include metadata that indicates elements, and properties thereof, within the source document or the source document may not include such metadata. In some implementations, the input file format includes a PDF or a word processing application file format, and the target output file format includes a web-fillable file format.

In some implementations, the interactive tool may be configured to enable manipulation of locations of the one or more elements within the electronic form represented by the intermediate file, manipulation of text included in the one or elements, copying of the one or more elements, or a combination thereof, based on the user input. For example, the interactive tool may be configured to enable a user to modify locations or text of elements, or perform other modifications, as described with reference to FIGS. 4A-4F. Additionally or alternatively, the interactive tool may be configured to display one or more sets of options for modifying parameters of a selected element of the one or more elements. In some such implementations, the parameters may include dimensions of the selected element, formatting associated with the selected element, a label associated with the selected element, a type associated with the selected element, one or more interactive aspects associated with the selected element, display properties associated with the selected element, or a combination thereof. For example, the interactive tool may be configured to enable a user to modify properties of a selected element using form element properties 412, as described with reference to FIGS. 4A-4F. Additionally or alternatively, the interactive tool may be configured to enable linking of a data source to a field within the electronic form represented by the intermediate file for auto-populating the field based on the data source. For example, an input field may be linked to a data source to cause the input field to be auto-populated with information from the data source, as described with reference to FIG. 5B.

In some implementations, converting the intermediate file to the output file may include setting one or more submission parameters of the output file to cause generation of one or more data structures including the input information upon submission of the electronic form represented by the output file. For example, one or more submission parameters of the output file may be set to cause generation of a data structure, such as a SharePoint list or a SQL table, as non-limiting examples, upon submission of the electronic form, as described with reference to FIGS. 1 and 12. In some such implementations, the one or more data structures may enable performance of one or more workflow operations. Additionally or alternatively, method 1400 may further include receiving a set of data structures and generating a second intermediate file representing a second electronic form based on the set of data structure. The second intermediate file may have the intermediate file format. For example, a data structure associated with an electronic form application may be used to generate an electronic form that is displayable and modifiable by the interactive tool, and is able to be converted to an output file that is configured to store input information in a data structure, as described with reference to FIGS. 8-12.

In some implementations, method 1400 also includes determining whether to perform element detection on the source document based on the input file format, metadata included in the source document, or a combination thereof. For example, element detector 120 may be configured to determine whether to perform element detection on the source document based on the input file format (e.g., whether the input file format is a file format that typically includes metadata), metadata included in the source document (e.g., if such metadata exists), or a combination thereof. In some such implementations, method 1400 may further include, based on a determination not to perform element detection on the source document, generating the one or more elements of the electronic form based on the metadata included in the source document. For example, element detector 120 may identify one or more elements in the source document (for conversion to one or more elements of the electronic document) based on the metadata included in the source document. Alternatively, the method 1400 may further include, based on a determination to perform element detection on the source document, detecting one or more elements of the source document from the data based on a predetermined element interpretation rule set. For example, element detector 120 may perform element detection on the source document based on predetermined element interpretation rule set 121.

In some implementations, the modification of the electronic form includes changing a type of an input field to a date field, and the date field is configured to initiate display of an interactive calendar for entering a date. For example, the interactive tool may be configured to enable a user to modify a type of a selected element using form element properties 412, as described with reference to FIGS. 4A-4F.

The type may be changed from an input field to a date field, as described with reference to FIGS. 4C-4D and 5B. Additionally or alternatively, the modification of the electronic form may include changing a type of a table to a repeating table, and the repeating table may be associated with one or more icons configured to enable addition or deletion of a row of the repeating table. For example, the interactive tool may be configured to enable a user to modify a type of a selected element using form element properties 412, as described with reference to FIGS. 4A-4F. The type may be changed to a repeating table, the operations of which are described with reference to FIG. 7B. Additionally or alternatively, the modification of the electronic form may include changing a type of an input field to a list field, and the list field may be configured to initiate display of an interactive list for selecting an input. For example, the interactive tool may be configured to enable a user to modify a type of a selected element using form element properties 412, as described with reference to FIGS. 4A-4F. The type may be changed to a list type, the operations of which are described with reference to FIG. 7A.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-14 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for converting legacy electronic forms and static electronic documents to web-fillable electronic forms, the method comprising:

receiving data corresponding to a source document, the source document having an input file format;

selectively performing element detection on the source document based on the input file format matching a particular file format, the element detection configured to detect one or more elements of the source document based at least in part on performing image processing on the data corresponding to the source document;

generating an intermediate file representing an electronic form based on the data, the intermediate file including metadata indicating the one or more elements of the source document, the intermediate file having an intermediate file format;

providing an interactive tool configured to enable display and modification of the electronic form, the interactive tool including one or more graphical user interfaces (GUIs) that depict a visual representation of the electronic form and enable a user to edit locations, within the visual representation of the electronic form and properties of the one or more elements based on user input indicating selection and manipulation of the one or more elements within the visual representation of the electronic form, the interactive tool further configured to enable addition of one or more additional elements to the electronic form and deletion of at least one of the one or more elements from the electronic form;

converting the modified intermediate file to an output file having a target output file format of one or more output file formats that are each distinct from the intermediate file format, the output file representing the electronic form configured to support user entry of input information; and outputting the output file.

2. The method of claim 1, wherein the source document comprises one of the legacy electronic forms or the static electronic documents.

3. The method of claim 1, wherein the interactive tool is configured to enable editing of the locations or the properties of the one or more elements within the electronic form represented by the intermediate file via one or more interactive menus to modify location parameters and dimension parameters.

4. The method of claim 1, wherein the interactive tool is configured to display one or more sets of options for modifying parameters of a selected element of the one or more elements within the visual representation of the electronic form represented by the intermediate file, the parameters including input type associated with an input field of the one or more elements.

5. The method of claim 4, wherein the parameters include dimensions of the selected element, formatting associated with the selected element, a label associated with the selected element, a type associated with the selected element, one or more interactive aspects associated with the selected element, display properties associated with the selected element, or a combination thereof.

6. The method of claim 1, wherein the interactive tool is configured to enable linking of a data source to a field within the electronic form represented by the intermediate file for auto-populating the field based on the data source.

7. The method of claim 1, wherein converting the intermediate file to the output file comprises setting one or more submission parameters of the output file to cause generation of one or more data structures including the input information upon submission of the electronic form represented by the output file.

8. The method of claim 7, wherein the one or more data structures enable performance of one or more workflow operations.

9. The method of claim 7, further comprising:
receiving a set of data structures; and
generating a second intermediate file representing a second electronic form based on the set of data structures, the second intermediate file having the intermediate file format.

10. The method of claim 1, wherein the particular file format comprises a file format configured to store document metadata corresponding to elements within a document.

11. The method of claim 1, further comprising, based on a determination not to perform the element detection on the source document, generating the one or more elements of the electronic form based on metadata included in the source document.

12. The method of claim 1, further comprising, based on a determination to perform the element detection on the source document, detecting one or more elements of the source document from the data based on a predetermined element interpretation rule set, the predetermined element interpretation rule set including text interpretation rules and visual element interpretation rules.

13. An apparatus for converting legacy electronic forms and static electronic documents to web-fillable electronic forms, the apparatus comprising:
a processor; and
a memory coupled to the processor and storing instructions executable by the processor to cause the processor to:
receive data corresponding to a source document, the source document having an input file format;
selectively perform element detection on the source document based on the input file format matching a particular file format, the element detection configured to detect one or more elements of the source document based at least in part on performing image processing on the data corresponding to the source document;
generate an intermediate file representing an electronic form based on the data, the intermediate file including metadata indicating the one or more elements of the source document, the intermediate file having an intermediate file format;
provide an interactive tool configured to enable display and modification of the electronic form, the interactive tool including one or more graphical user interfaces (GUIs) that depict a visual representation of the electronic form and enable a user to edit locations of the one or more elements within the visual representation of the electronic form and properties of the one or more elements based on user input indicating selection and manipulation of the one or more elements within the visual representation of the electronic form, the interactive tool further configured to enable addition of one or more additional elements to the electronic form and deletion of at least one of the one or more elements from the electronic form;
convert the modified intermediate file to an output file having a target output file format of one or more output file formats that are each distinct from the intermediate file format, the output file representing the electronic form configured to support user entry of input information; and
output the output file.

14. The apparatus of claim 13, further comprising:
a database coupled to the processor, the database configured to store intermediate files, output files, source files, or a combination thereof.

15. The apparatus of claim 13, further comprising:
an interface coupled to the processor and configured to enable communication with a data source that stores the data, an electronic device, or a combination thereof.

16. The apparatus of claim 13, wherein the input file format comprises a portable document format (PDF) or a word processing application file format, and wherein the target output file format comprises a web-fillable file format.

17. A non-transitory computer-readable medium storing instructions that, when executed by a processor, cause the processor to perform operations comprising:
receiving data corresponding to a source document, the source document having an input file format;
selectively performing element detection on the source document based on the input file format matching a particular file format, the element detection configured to detect one or more elements of the source document based at least in part on performing image processing on the data corresponding to the source document;
generating an intermediate file representing an electronic form based on the data, the intermediate file including metadata indicating the one or more elements of the source document, the intermediate file having an intermediate file format;
providing an interactive tool configured to enable display and modification of the electronic form, the interactive tool including one or more graphical user interfaces (GUIs) that depict a visual representation of the electronic form and enable a user to edit locations of the one or more elements within the visual representation of the electronic form and properties of the one or more elements based on user input indicating selection and manipulation of the one or more elements within the visual representation of the electronic form, the interactive tool further configured to enable addition of one or more additional elements to the electronic form and deletion of at least one of the one or more elements from the electronic form;
converting the modified intermediate file to an output file having a target output file format of one or more output file formats that are each distinct from the intermediate file format, the output file representing the electronic form configured to support user entry of input information; and
outputting the output file.

18. The non-transitory computer readable medium of claim 17, wherein editing the properties of the one or more elements includes changing a type of an input field to a date field or a list field, wherein the date field is configured to initiate display of an interactive calendar for entering a date, and wherein the list field is configured to initiate display of an interactive list for selecting an input.

19. The non-transitory computer readable medium of claim 17, wherein editing the properties of the one or more elements includes changing a type of a table to a repeating table, and wherein the repeating table is associated with one or more icons configured to enable addition or deletion of a row of the repeating table.

20. The non-transitory computer readable medium of claim 17, wherein the intermediate file format is distinct from any particular electronic form format.

* * * * *

UNITED STATES PATENT AND TRADEMARK OFFICE
CERTIFICATE OF CORRECTION

| | |
|---|---|
| PATENT NO. | : 11,341,318 B2 |
| APPLICATION NO. | : 16/922974 |
| DATED | : May 24, 2022 |
| INVENTOR(S) | : Robert Thomas D'Oria et al. |

It is certified that error appears in the above-identified patent and that said Letters Patent is hereby corrected as shown below:

In the Claims

Column 37, Claim 1, Line 16, delete "locations, within" and replace with --locations of the one or more elements within--.

Signed and Sealed this
Second Day of August, 2022

Katherine Kelly Vidal
*Director of the United States Patent and Trademark Office*